| (12) | United States Patent | (10) Patent No.: | US 8,743,532 B2 |
|---|---|---|---|
| | Yano et al. | (45) Date of Patent: | Jun. 3, 2014 |

(54) SWITCHGEAR

(75) Inventors: Tomotaka Yano, Chiyoda-ku (JP);
Satoru Yoshida, Chiyoda-ku (JP);
Masahiro Arioka, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 234 days.

(21) Appl. No.: 13/262,022

(22) PCT Filed: Aug. 25, 2009

(86) PCT No.: PCT/JP2009/064775
§ 371 (c)(1),
(2), (4) Date: Sep. 29, 2011

(87) PCT Pub. No.: WO2011/024256
PCT Pub. Date: Mar. 3, 2011

(65) Prior Publication Data
US 2012/0024506 A1    Feb. 2, 2012

(51) Int. Cl.
*H05K 7/20* (2006.01)
(52) U.S. Cl.
USPC ........... 361/678; 361/605; 361/612; 361/676; 361/677; 361/679.46; 361/704; 165/104.33; 165/185; 174/50; 174/50.5; 174/520; 312/223.2
(58) Field of Classification Search
USPC ......... 361/600, 604, 605, 606, 611, 612, 676, 361/678, 714, 679.46, 679.54, 704–712; 165/177, 179, 181, 183, 185, 104.33; 174/50, 50.5, 17 GF, 15.6, 520, 70 B, 174/88 B, 99 B; 312/223.2, 223.3, 236
See application file for complete search history.

(56) References Cited

U.S. PATENT DOCUMENTS

| 3,662,137 | A | * | 5/1972 | Cleaveland | 200/289 |
|---|---|---|---|---|---|
| 4,005,297 | A | | 1/1977 | Cleaveland | |
| 4,118,755 | A | * | 10/1978 | Davies et al. | 361/678 |

(Continued)

FOREIGN PATENT DOCUMENTS

| DE | 2038684 A1 | 2/1972 | |
|---|---|---|---|
| DE | 29602184 U1 * | 3/1997 | H02B 1/56 |

(Continued)

OTHER PUBLICATIONS

International Search Report (PCT/ISA/210) issued on Sep. 29, 2009, by Japanese Patent Office as the International Searching Authority for International Application No. PCT/JP2009/064775.

(Continued)

*Primary Examiner* — Michail V Datskovskiy
(74) *Attorney, Agent, or Firm* — Buchanan Ingersoll & Rooney PC

(57) ABSTRACT

In order to obtain a switchgear which can improve heat dissipation efficiency, in the switchgear which dissipates heat outside an apparatus vessel, the heat being generated from an electrical apparatus placed in the apparatus vessel, the switchgear includes a first heat conductor in which one side is connected to a heat generation portion of the apparatus vessel and the other side is extended toward the apparatus vessel side, a second heat conductor in which one side is disposed near the other side of the first heat conductor and the other side is extended outside the apparatus vessel, and an insulating member between conductors disposed between the other side of the first heat conductor and one side of the second heat conductor.

19 Claims, 36 Drawing Sheets

(56) References Cited

U.S. PATENT DOCUMENTS

| | | | |
|---|---|---|---|
| 6,002,085 A * | 12/1999 | Utsumi et al. | 174/28 |
| 6,018,455 A * | 1/2000 | Wilkie et al. | 361/676 |
| 7,038,912 B2 * | 5/2006 | Pleines et al. | 361/704 |
| 7,147,051 B2 * | 12/2006 | Keller et al. | 165/185 |
| 8,169,775 B2 * | 5/2012 | Bortoli et al. | 361/677 |
| 8,189,325 B2 * | 5/2012 | Kurogi et al. | 361/678 |
| 8,437,118 B2 * | 5/2013 | Kasza et al. | 361/605 |
| 2005/0219804 A1 | 10/2005 | Arioka | |
| 2007/0165375 A1 * | 7/2007 | Nicolai et al. | 361/688 |
| 2009/0296320 A1 | 12/2009 | Fink et al. | |

FOREIGN PATENT DOCUMENTS

| | | |
|---|---|---|
| DE | 19935658 A1 | 2/2001 |
| DE | 10-2005-029-600 A1 | 1/2006 |
| JP | 57-018830 A | 1/1982 |
| JP | 64-020791 U | 2/1989 |
| JP | 402193509 A * | 7/1990 ........... H02B 13/055 |
| JP | 8-223719 A | 8/1996 |
| JP | 2001-112129 | 4/2001 |
| JP | 2001-112129 A | 4/2001 |
| JP | 2004-153954 | 5/2004 |
| JP | 2004-153954 A | 5/2004 |
| JP | 2007-028776 | 2/2007 |
| JP | 2007-028776 A | 2/2007 |
| JP | 2007-109991 | 4/2007 |
| JP | 2007-109991 A | 4/2007 |
| JP | 2007-200977 | 8/2007 |
| JP | 2007-200977 A | 8/2007 |

OTHER PUBLICATIONS

German Office Action dated Mar. 12, 2013, issued in corresponding German Patent Application No. 11 2009 005 167.7. (4 pgs).

Chinese Office Action (First Office Action) dated Dec. 3, 2013, issued in corresponding Chinese Application No. 200980159816.6 and an English Translation of the Office Action. (17 pp).

* cited by examiner (Prior Art)

SWITCHGEAR

TECHNICAL FIELD

The present invention relates to a switchgear equipped with a high voltage electrical apparatus such as a gas insulated switchgear placed in a vessel filled with insulating gas such as SF6 gas together with electrical apparatuses and high voltage conductors and, more particularly, relates to a heat dissipation structure for a portion where high heat is generated.

BACKGROUND ART

As a conventional switchgear equipped with a high voltage electrical apparatus such as a gas insulated switchgear placed in a vessel filled with insulating gas such as SF6 gas together with electrical apparatuses and high voltage conductors, there is one shown in FIG. 49.

In FIG. 49, a bus bar 4, a gas circuit breaker 5, main circuit conductors 6,7 with high voltage are placed in vessels 1,2,3 and insulating gas such as SF6 gas is filled inside the vessels. Incidentally, a reference numeral 8 denotes an operating panel and 12 denotes an attaching portion of the bus bar to be connected to an adjacent unit.

Furthermore, the vessels 1,2 are formed with opening portions which are for performing assembling work, internal inspection work, or the like, and the vessels 1,2 are provided with covering plates 11,13 which cover the opening portions. Then, during the assembling work or during the inspection work, these covering plates 11,13 are removed and the assembling work or the inspection work for the inside of the vessels 1,2,3 is performed by a worker through the openings.

By the way, heat dissipating fins 21,22 are provided on both surfaces of the outside surface side and the inner surface side of the covering plate 11, respectively. The respective heat dissipating fins 21,22 are arranged so that longitudinal directions thereof are perpendicular when the covering plate 11 is attached to the vessel 2. The heat dissipating fins 22 on the inner surface side of the covering plate 11 are arranged in face-to-face relation to charged portions such as the main circuit conductor 6 arranged in the vessel 2.

In the thus configured switchgear, when a current flows through current conducting portions such as the bus bar 4, the gas circuit breaker 5, the main circuit conductors 6,7 placed in the vessels 1,2,3, Joule heat is generated to increase the temperature of the current conducting portions. Furthermore, an induced current is generated in the vessels 1,2,3 by the current flowing through the current conducting portions; and Joule heat is also generated in the vessels 1,2,3 to increase the temperature thereof.

As described above, the heat generated in the current conducting portions, for example, high heat generated by the main circuit conductor 6 serving as a high temperature portion of the vessel 2, is mainly transferred to the vessel 2 including the covering plate 11 through the insulating gas. Furthermore, the heat transferred to the vessel 2 and the heat generated in the vessel 2 itself are dissipated outside the vessel 2 and, at the same time, such heat is also transferred to the covering plate 11 via the vessel 2. In this case, the heat dissipating fins 22 provided on the inner surface side of the covering plate 1 transfers the heat of the insulating gas to the covering plate 11. In addition, the covering plate 11 itself and the heat dissipating fins 21 on the outside surface side of the covering plate 11 dissipate the heat transferred to the covering plate 11 outside the vessel 2.

Patent Document 1: Japanese Unexamined Patent Publication No. H8-223719

DISCLOSURE OF THE INVENTION

Problems to be Solved by the Invention

In the aforementioned conventional switchgear, in order to dissipate heat outside the vessel 2, the heat being generated in the current conducting portions, for example, the heat being generated by the main circuit conductor 6 serving as the high temperature portion of the vessel 2, the heat is transferred to the heat dissipating fins 22 by heat exchange by indirect heat transfer by natural convection between each of the current conducting portions and the corresponding heat dissipating fins 22 provided on the inner surface side of the vessel 2 through the insulating gas in the vessel 2. The heat transferred to the heat dissipating fins 22 is conducted to the covering plate 11, and the conducted heat is conducted to the heat dissipating fins 21 provided on the outside surface side of the covering plate 11 via the covering plate 11 to be dissipated outside the vessel 2 from the heat dissipating fins 21 by natural convection.

However, in the aforementioned switchgear, the heat generated in the current conducting portion, for example, the heat generated by the main circuit conductor 6 serving as the high temperature portion of the vessel 2 is transferred to a plurality of the heat dissipating fins 22 on the inner surface side the covering plate 11 by heat exchange by indirect heat transfer by natural convection through the insulating gas in the vessel 2 and the transferred heat is further transferred to the heat dissipating fins 21 on the outer surface side of the covering plate 11; and accordingly, the efficiency of heat transfer is extremely low.

Therefore, in order to efficiently dissipate the heat, for example, generated by the main circuit conductor 6 serving as the high temperature portion of the vessel 2, the heat dissipating fins 21,22 need to be increased or a sectional area of the main circuit conductor 6 needs to be increased for reducing internal electric resistance; and accordingly, a problem exists in that it causes cost-up and the vessel 2 needs to be increased in size.

The present invention has been made to solve the problem described above, and an object of the present invention is to provide a switchgear which can improve heat dissipation efficiency.

Problems to be Solved by the Invention

According to the present invention, there is provided a switchgear which dissipates heat outside an apparatus vessel, the heat being generated from an electrical apparatus placed in the apparatus vessel. The switchgear includes a first heat conductor in which one side is connected to a heat generation portion of the apparatus vessel and the other side is extended toward the apparatus vessel side, a second heat conductor in which one side is disposed near the other side of the first heat conductor and the other side is extended outside the apparatus vessel, and an insulating member between conductors disposed between the other side of the first heat conductor and one side of the second heat conductor.

Further, according to the present invention, there is provided a switchgear which dissipates heat outside an apparatus vessel, the heat being generated from an electrical apparatus placed in the apparatus vessel. The switchgear includes a heat conductor in which one side is connected to a heat generation portion of the apparatus vessel and the other side is extended toward the apparatus vessel side; an insulating member disposed between the other side end surface of the heat conductor and an inner wall of the apparatus vessel; a periphery portion insulating member provided on the periphery of the heat conductor and connected to the insulating member; and a heat dissipating member attached to an outer wall of the apparatus vessel opposite to the other side of the heat conductor.

Advantageous Effect of the Invention

A switchgear according to the present invention dissipates heat of a heat generation portion outside an apparatus vessel by a heat conductor connected to the heat generation portion of the apparatus vessel; whereby it is possible to obtain a switchgear which can improve heat dissipation efficiency.

MODE FOR CARRYING OUT THE INVENTION

Embodiment 1.

Figure 1:
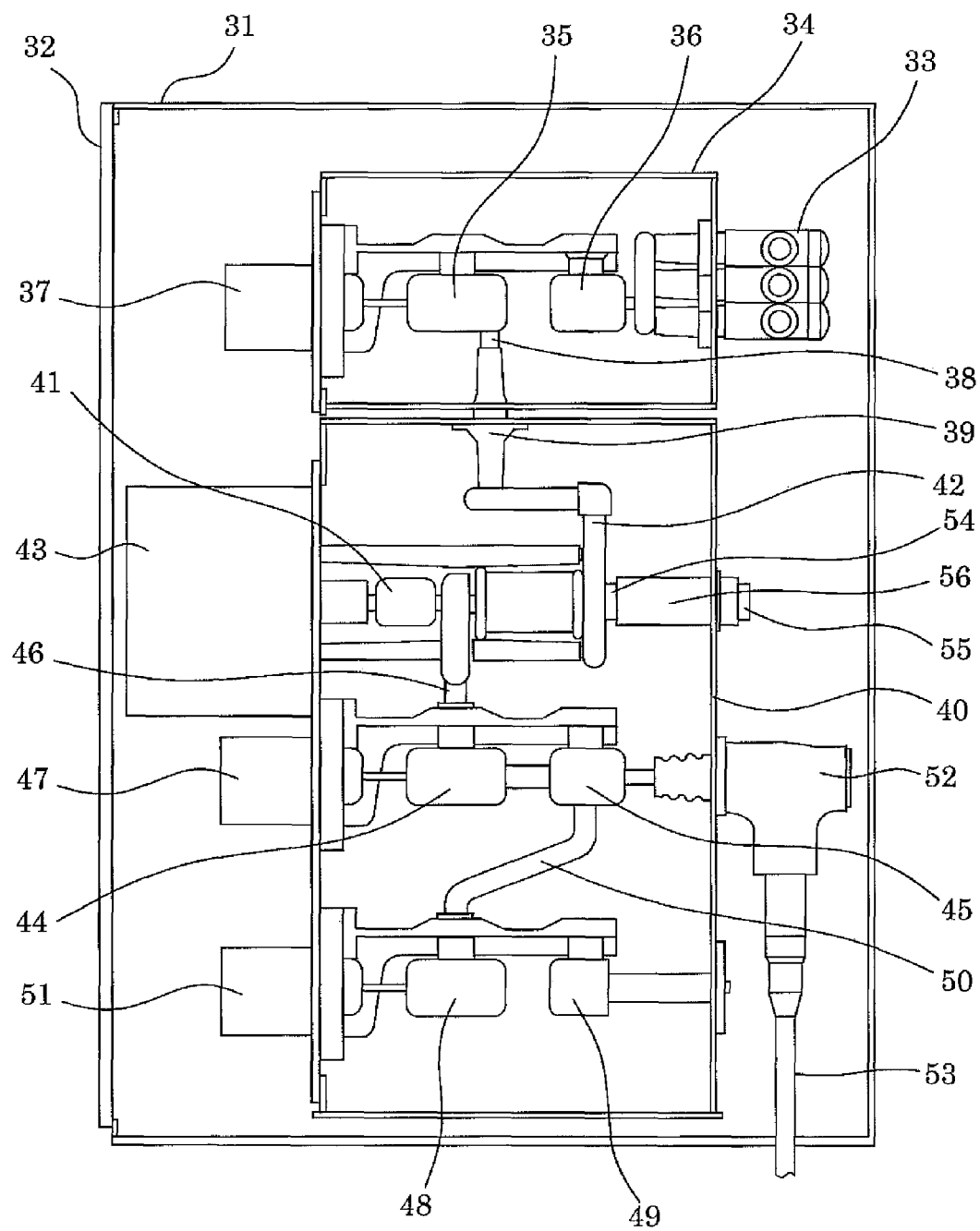
FIG. 1 is a side view showing a switchgear according to Embodiment 1 of the present invention.
Figure 2:
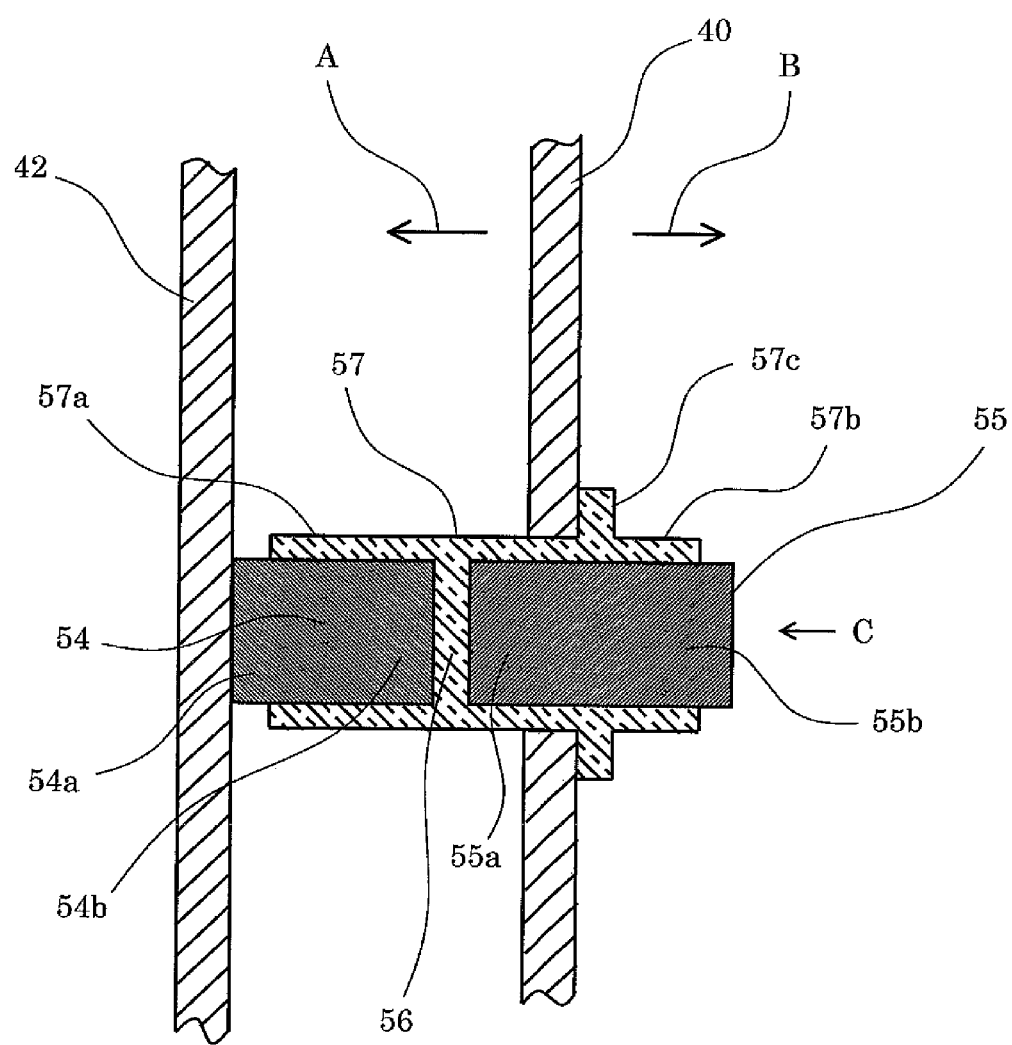
FIG. 2 is a cross-sectional side view showing a relevant part of the switchgear according to Embodiment 1 of the present invention.
Figure 3:
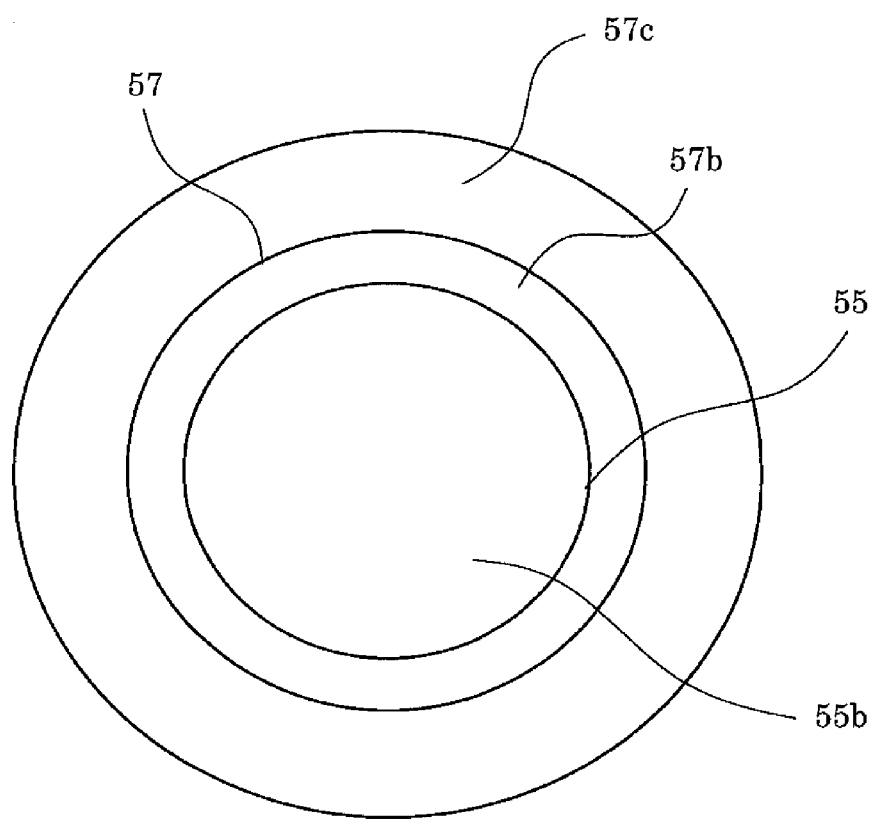
FIG. 3 is a view in which the relevant part of the switchgear according to Embodiment 1 of the present invention is seen from a direction of an arrow C.

Hereinafter, Embodiment 1 of the present invention will be described with reference to FIG. 1 to FIG. 3. FIG. 1 is a side view showing a switchgear according to Embodiment 1 of the present invention. FIG. 2 is a cross-sectional side view showing a relevant part of the switchgear according to Embodiment 1 of the present invention. FIG. 3 is a view in which the relevant part of the switchgear according to Embodiment 1 of the present invention is seen from a direction of an arrow C.

In these respective drawings, a reference numeral 31 denotes a housing of the switchgear equipped with a high voltage electrical apparatus such as a gas insulated switchgear placed in a vessel filled with insulating gas such as SF6 gas together with electrical apparatuses and high voltage conductors; and an openable and closable exterior panel 32 is provided on the front side of the housing 31. 33 denotes a bus bar attached to a vessel 34 in the upper side in the housing 31. 35 and 36 denote a grounding switch and a disconnecting switch, which are attached to the vessel 34; and switching operation is performed by an operating mechanism unit 37. 38 denotes a connection conductor passing through a bushing 39 and passing into an apparatus vessel 40 disposed under the vessel 34.

The apparatus vessel 40 is filled with insulating gas such as SF6 gas, dry air, nitrogen gas, air, or the like and is in an insulating gas atmosphere. A circuit breaker 41 is placed in the apparatus vessel 40 and is electrically connected to the connection conductor 38 by a main circuit conductor 42 serving as a high voltage conductor. 43 denotes an operating mechanism unit of the circuit breaker 41. 44 and 45 denote a grounding switch and a disconnecting switch, both of which are placed below the circuit breaker 41 in the apparatus vessel 40 and are connected to the circuit breaker 41 by connection conductors 46; and switching operation is performed by an operating mechanism unit 47.

48 and 49 denote a grounding switch and a lightning arrester, both of which are placed below the grounding switch 44 and the disconnecting switch 45 in the apparatus vessel 40 and are connected to the disconnecting switch 45 by connection conductors 50; and switching operation of the grounding switch 48 is performed by an operating mechanism unit 51 to perform connection/disconnection operation of the lightning arrester 49. 52 denotes a cable head of a cable 53 and the cable head 52 is connected to the disconnecting switch 45.

54 denotes a first heat conductor disposed in the apparatus vessel 40, for example, shown by an arrow A; one side 54a of the first heat conductor 54 is connected to a heat generation portion of the apparatus vessel 40, for example, connected to a main circuit conductor 42 as an example in the drawing, and the other side 54b is extended toward the apparatus vessel 40 side; and the first heat conductor 54 is made of, for example, copper or aluminum that is excellent in high heat conductivity. Furthermore, the drawing shows the case where the first heat conductor 54 is formed in a round bar shape, as an example. 55 denotes a second heat conductor in which one side 55a is disposed near the other side 54b of the first heat conductor 54 and the other side 55b is extended outside the apparatus vessel 40 as shown by an arrow B; and the second heat conductor 55 is made of, for example, copper or aluminum that is excellent in high heat conductivity. Furthermore, the drawing shows the case where the second heat conductor 55 is formed in a round bar shape as an example. Further, the drawing shows the case where the first heat conductor 54 and the second heat conductor 55 are coaxially arranged, as an example. That is, the end surface of the other side 54b of the first heat conductor 54 and the end surface of one side 55a of the second heat conductor 55 are arranged in face-to-face relation to each other in an axial direction.

56 denotes an insulating member between conductors disposed between the other side 54b of the first heat conductor 54 and one side 55a of the second heat conductor 55. The insulating member between conductors 56 is made of resin that is excellent in high heat conductivity which provides electrical insulation between the first heat conductor 54 and the second heat conductor 55 and can efficiently transfer heat of the first heat conductor 54 to the second heat conductor 55.

57 denotes a periphery portion insulating member which is formed, for example, in a cylindrical shape and is disposed by striding over the periphery of the first heat conductor 54 and the periphery of the second heat conductor 55. The periphery portion insulating member 57 can further enhance electrical insulation performance between the first heat conductor 54 and the second heat conductor 55 and has electrical insulation performance between the first heat conductor 54 and the second heat conductor 55 and between the second heat conductor 55 and the apparatus vessel 40. Furthermore, one side 57a of the periphery portion insulating member 57 is extended near the main circuit conductor 42; and the other side 57b is extended outside the apparatus vessel 40 to also provide electrical insulation from the apparatus vessel 40. The other side 57b of the periphery portion insulating member 57 is provided with, for example, a circularly shaped flange portion 57c; and the flange portion 57c is attached to the apparatus vessel 40 with an O-ring (not shown in the drawing) intervening therebetween. Incidentally, the periphery portion insulating member 57 is made of resin that is excellent in high heat conductivity. The periphery portion insulating member 57 absorbs heat of, for example, insulating gas in the apparatus vessel 40 to conduct the heat to the first heat conductor 54 and can dissipate heat of the second heat conductor 55 outside the apparatus vessel 40.

Next, operation will be described. In the switchgear of Embodiment 1, heat generated in the current conducting portion, for example, high heat generated by the main circuit conductor 42 serving as a high temperature portion in the apparatus vessel 40 is directly conducted to one side 54a of the first heat conductor 54 and conducted to the other side 54b of the first heat conductor 54. The high heat which is generated by the main circuit conductor 42 and conducted to the other side 54b of the first heat conductor 54 is conducted to the one side 55a of the second heat conductor 55 through the insulating member between conductors 56 made of resin that is excellent in high heat conductivity and conducted to the other side 55b of the second heat conductor 55; and the conducted heat is dissipated outside the apparatus vessel 40 from an end surface portion surround of the other side 55b of the second heat conductor 55.

In Embodiment 1, the heat generated in the current conducting portion, for example, the high heat generated by the main circuit conductor 42 serving as the high temperature portion of the apparatus vessel 40 is not transferred by heat exchange by indirect heat transfer by natural convection through the insulating gas in the apparatus vessel 40 as in the aforementioned conventional switchgear; but, the high heat is dissipated outside the apparatus vessel 40 by direct heat conduction by the first heat conductor 54 and the second heat conductor 55. Accordingly, it is possible to obtain a switchgear which can simplify a structure, achieve good heat transfer efficiency, and remarkably improve heat dissipation performance without arranging the plurality of the heat dissipating fins 21,22 as in the aforementioned conventional switchgear. Furthermore, the inside of the apparatus vessel 40 can be efficiently cooled; and reduction of the heat dissipating fins or the like, reduction in sectional area of the main circuit conductor 42, and reduction in size of the apparatus vessel 40 can be achieved.

Furthermore, in Embodiment 1 of the present invention, the heat is dissipated by direct heat conduction by the first heat conductor 54 and the second heat conductor 55; and therefore, a driving unit for a fan or the like and a refrigerant for use in a heat pipe or the like are not necessary and thus heat dissipation performance with high reliability can be obtained. Further, the first heat conductor 54 and the second heat conductor 55 are insulated from the apparatus vessel 40 by the insulating member between conductors 56 and the periphery portion insulating member 57; and therefore, the first heat conductor 54 and the second heat conductor 55 can be used as an antenna of an electroscope or a partial discharge detector.

By the way, the periphery portion insulating member 57 is disposed by striding over the periphery of the first heat conductor 54 and the periphery of the second heat conductor 55; and accordingly, electrical insulation performance between the first heat conductor 54 and the second heat conductor 55 and electrical insulation performance between the second heat conductor 55 and the apparatus vessel 40 can be further enhanced, and electrical insulation performance between the first heat conductor 54 and the second heat conductor 55 and electrical insulation performance between the second heat conductor 55 and the apparatus vessel 40 are provided. Furthermore, the periphery portion insulating member 57 is made of resin that is excellent in high heat conductivity; and accordingly, for example, the heat of the insulating gas in the apparatus vessel 40 is absorbed and conducted to the first heat conductor 54 and some of the heat of the second heat conductor 55 can be dissipated outside the apparatus vessel 40. Heat dissipation performance as the whole switchgear can be further improved.

Embodiment 2.

Figure 4:
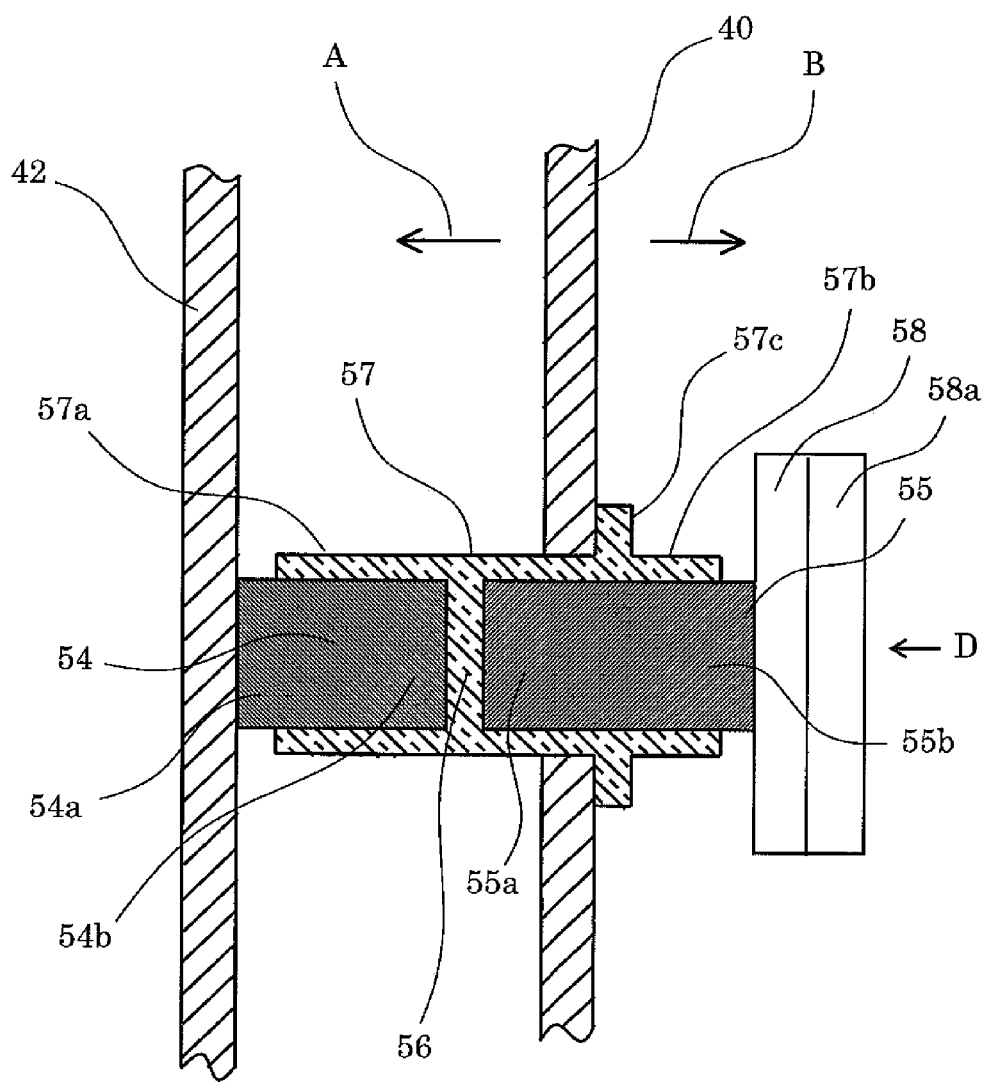
FIG. 4 is a cross-sectional side view showing a relevant part of a switchgear according to Embodiment 2 of the present invention.
Figure 5:
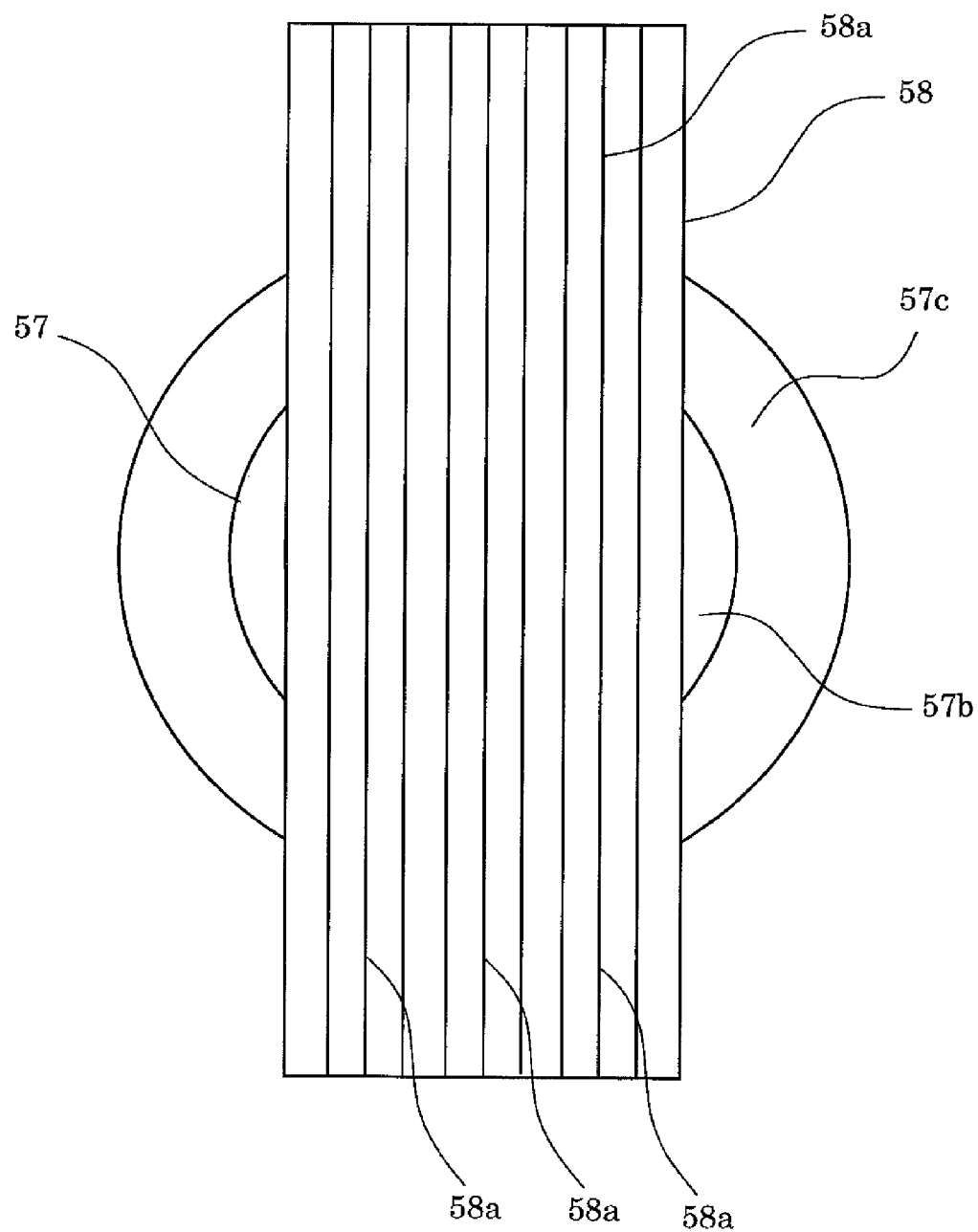
FIG. 5 is a view in which the relevant part of the switchgear according to Embodiment 2 of the present invention is seen from a direction of an arrow D.
Figure 6:
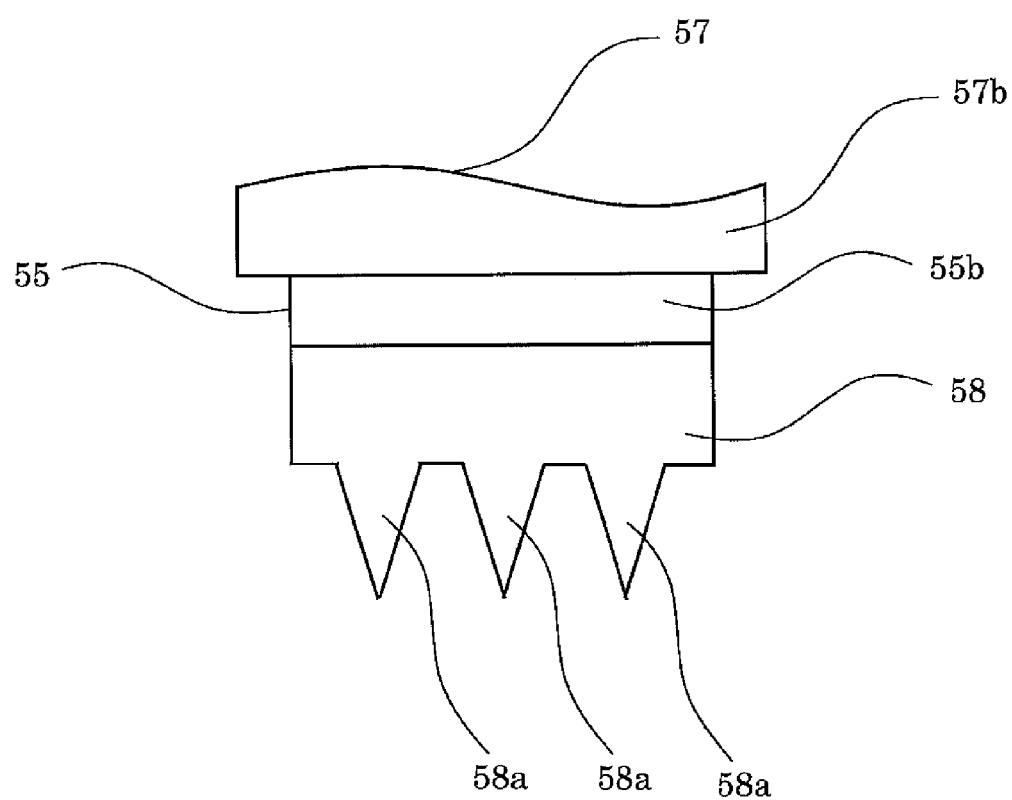
FIG. 6 is a view in which the relevant part of the switchgear according to Embodiment 2 of the present invention is seen from above.

Embodiment 2 of the present invention will be described with reference to FIG. 4 to FIG. 6. FIG. 4 is a cross-sectional side view showing a relevant part of a switchgear according to Embodiment 2 of the present invention. FIG. 5 is a view in which the relevant part of the switchgear according to Embodiment 2 of the present invention is seen from a direction of an arrow D. FIG. 6 is a view in which the relevant part of the switchgear according to Embodiment 2 of the present invention is seen from above.

In Embodiment 2, a heat dissipating member 58 is provided on an end surface portion of the other side 55b of a second heat conductor 55, and the heat dissipating member 58 is formed with a plurality of fin bodies 58a extending in a vertical direction.

As described above, the heat dissipating member 58 is provided on the end surface portion of the other side 55b of the second heat conductor 55; and accordingly, a heat dissipation surface area provided outside an apparatus vessel 40 can be remarkably increased. Therefore, it is possible to obtain a switchgear in which heat dissipation performance can be further improved than the aforementioned Embodiment 1.

Embodiment 3.

Figure 7:
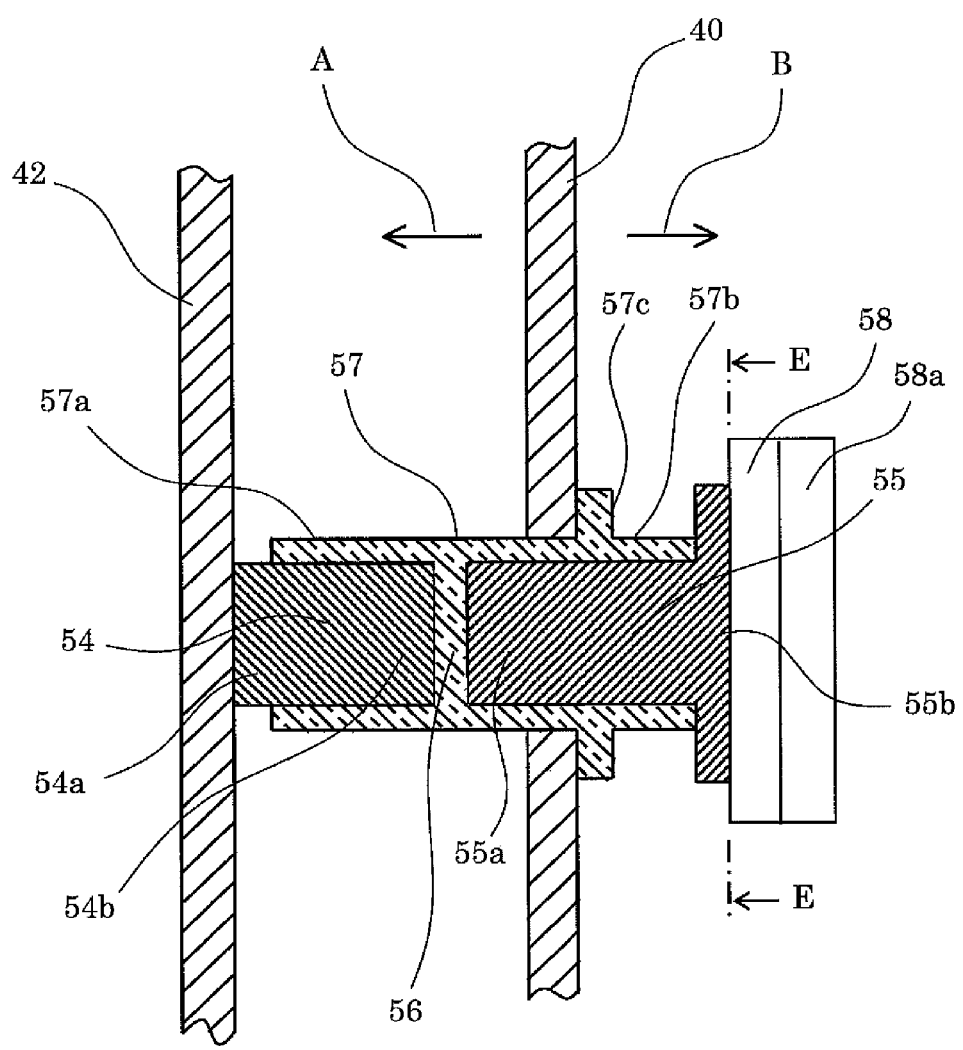
FIG. 7 is a cross-sectional side view showing a relevant part of a switchgear according to Embodiment 3 of the present invention.
Figure 8:
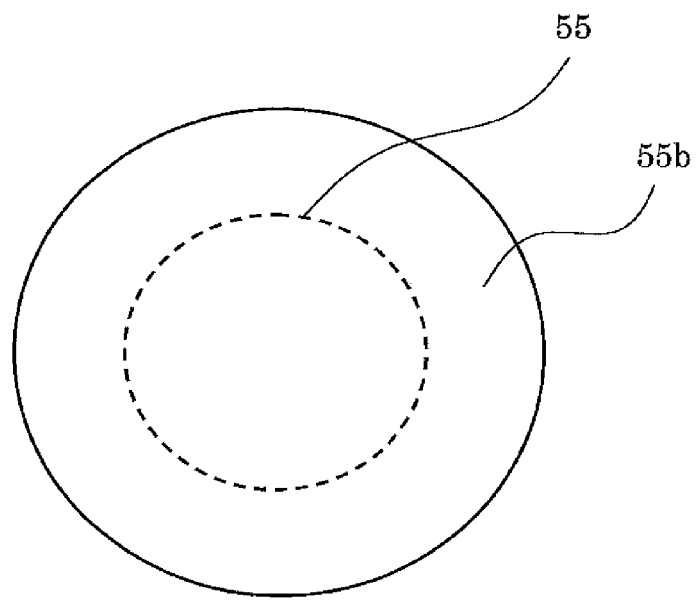
FIG. 8 is a view in which the relevant part of the switchgear according to Embodiment 3 of the present invention is seen from a direction of arrows E-E.

Embodiment 3 of the present invention will be described with reference to FIG. 7 and FIG. 8. FIG. 7 is a cross-sectional side view showing a relevant part of a switchgear according to Embodiment 3 of the present invention. FIG. 8 is a view in which the relevant part of the switchgear according to Embodiment 3 of the present invention is seen from a direction of arrows E-E.

In Embodiment 3, the shape of an end surface portion of the other side 55b of a second heat conductor 55, the end surface portion being provided with a heat dissipating member 58, is larger than the shape of one side 55a of the second heat conductor 55, that is, larger in diameter; and accordingly, a contact portion area with the heat dissipating member 58 is increased.

As described above, the diameter of the end surface portion of the other side 55b of the second heat conductor 55 is larger than the diameter of one side 55a of the second heat conductor 55; and accordingly, it is possible to obtain a switchgear in which the contact portion area between the end surface portion of the other side 55b of the second heat conductor 55 and the heat dissipating member 58 is increased, heat conduction efficiency from the other side 55b of the second heat conductor 55 to the heat dissipating member 58 can be further improved, and heat dissipation performance is further excellent than the aforementioned Embodiment 2.

Embodiment 4.

Figure 9:
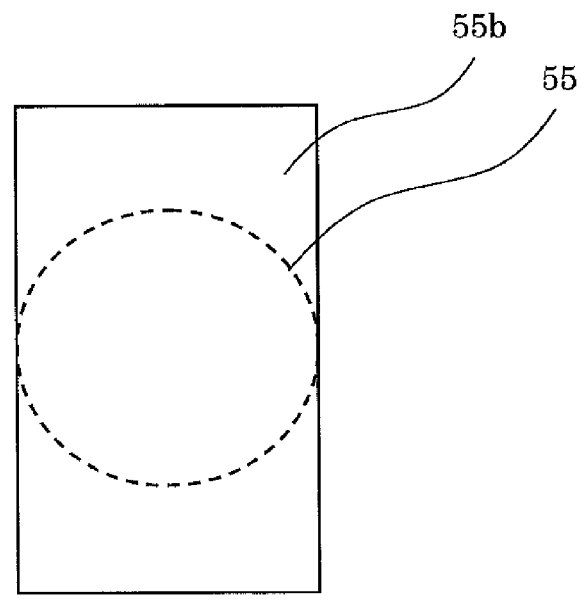
FIG. 9 is a view showing other example of a relevant part of a switchgear according to Embodiment 4 of the present invention.

Embodiment 4 of the present invention will be described with reference to FIG. 9. FIG. 9 is a view showing other example of a relevant part of a switchgear according to Embodiment 4 of the present invention.

In the aforementioned Embodiment 3, the description has been made on the case where the end surface portion of the other side 55b of the second heat conductor 55 is in the shape of a circular; however, in Embodiment 4, an end surface portion of the other side 55b of a second heat conductor 55 is formed in a rectangular shape extending in a vertical direction and similar effects to the aforementioned Embodiment 3 can be exhibited. Furthermore, the end surface portion of the other side 55b is a shape in which material of a portion which does not come into contact with a heat dissipating member 58 is eliminated; and accordingly, reduction in material cost can also be achieved.

Embodiment 5.

Figure 10:
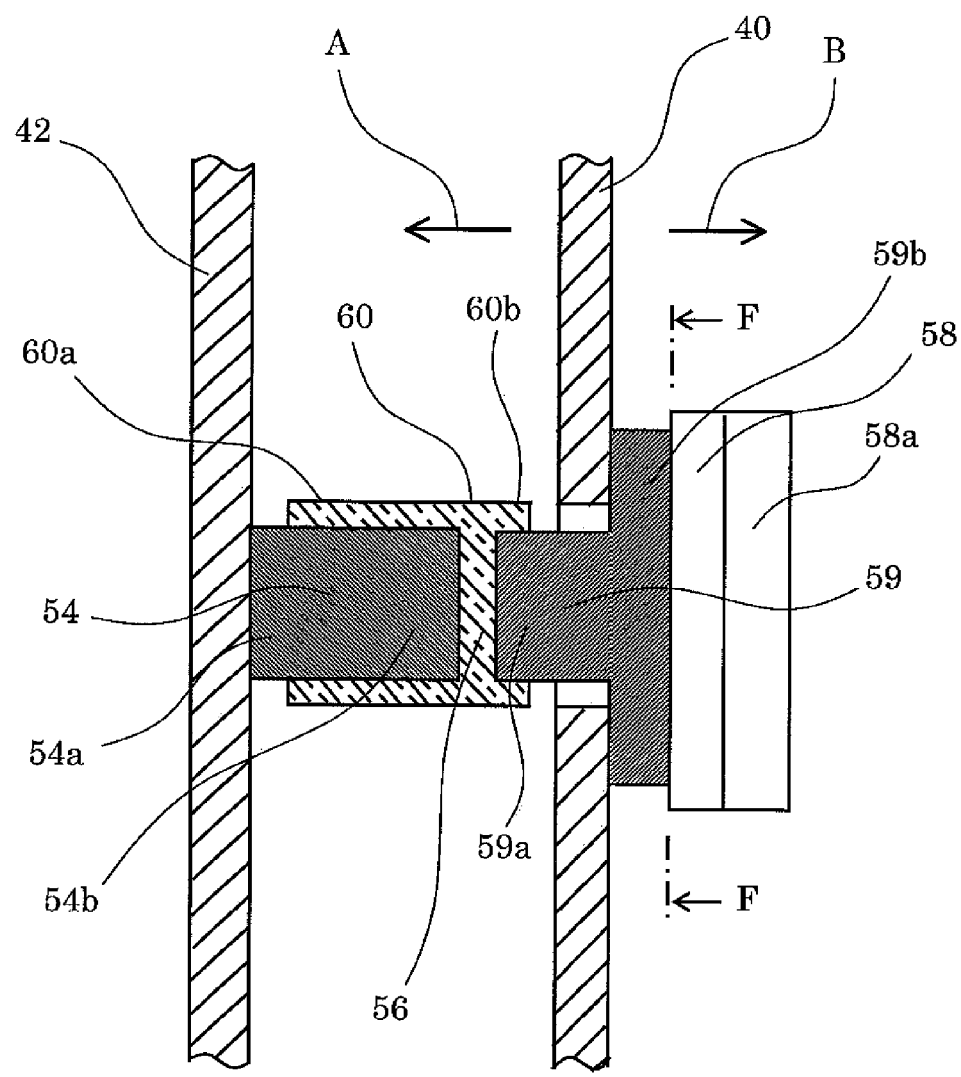
FIG. 10 is a cross-sectional side view showing a relevant part of a switchgear according to Embodiment 5 of the present invention.
Figure 11:
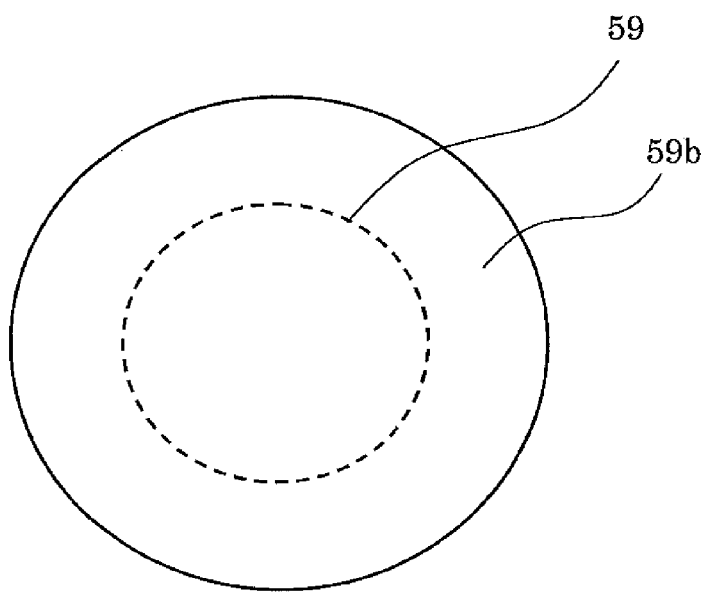
FIG. 11 is a view in which the relevant part of the switchgear according to Embodiment 5 of the present invention is seen from a direction of arrows F-F.

Embodiment 5 of the present invention will be described with reference to FIG. 10 and FIG. 11. FIG. 10 is a cross-sectional side view showing a relevant part of a switchgear according to Embodiment 5 of the present invention. FIG. 11 is a view in which the relevant part of the switchgear according to Embodiment 5 of the present invention is seen from a direction of arrows F-F.

In Embodiment 5, the shape of an end surface portion of the other side 59b of a second heat conductor 59 is larger than the shape of one side 59a of the second heat conductor 59, that is, larger in diameter; and accordingly, a contact portion area with a heat dissipating member 58 is increased. Furthermore, the other side 59b of the second heat conductor 59 is directly attached to an outer surface of an apparatus vessel 40 with an O-ring (not shown in the drawing) intervening therebetween. Further, a periphery portion insulating member 60 formed, for example, in a cylindrical shape is disposed in the apparatus vessel 40, the periphery portion insulating member 60 being disposed by striding over the periphery of a first heat conductor 54 and the periphery of a second heat conductor 55. That is, one side 60a of the periphery portion insulating member 60 is extended near a main circuit conductor 42; and the other side 60b is extended near the inner surface of the apparatus vessel 40, but not extended outside the apparatus vessel 40.

Furthermore, electrical insulation between the first heat conductor 54 and the second heat conductor 59 and electrical insulation between the second heat conductor 59 and the apparatus vessel 40 are provided by the periphery portion insulating member 60 which is disposed by striding over the periphery of the first heat conductor 54 and the periphery of the one side 59a of the second heat conductor 55 and an insulating member between conductors 56; and therefore, even when the other side 59b of the second heat conductor 59 is attached on the outer surface of the apparatus vessel 40, there is no problem.

As described above, in Embodiment 5, the other side 59b of the second heat conductor 59 is directly attached to the outer surface of the apparatus vessel 40; and accordingly, the configuration of the other side 60b of the periphery portion insulating member 60 can be simplified. That is, the other side 60b of the periphery portion insulating member 60 does not need to be protruded outside the apparatus vessel 40; and thus, a simple configuration is achieved and a flange portion does not need to be provided.

Furthermore, the diameter of the other side 59b of the second heat conductor 59 is larger than the diameter of one side 59a of the second heat conductor 59; and accordingly, a contact portion area between the other side 59b of the second heat conductor 59 and the heat dissipating member 58 can be increased and heat conduction efficiency from the other side 59b of the second heat conductor 59 to the heat dissipating member 58 can be further improved.

Further, the other side 59b of the second heat conductor 59 is directly attached to the outer surface of the apparatus vessel 40; and accordingly, it becomes possible to provide heat transfer by heat conduction from the other side 59b of the second heat conductor 59 to the apparatus vessel 40. That is, the outside surface of the apparatus vessel 40 can be utilized as a heat dissipation surface; and accordingly, it is possible to obtain a switchgear in which the efficiency of heat dissipation performance can be further improved.

Embodiment 6.

Figure 12:
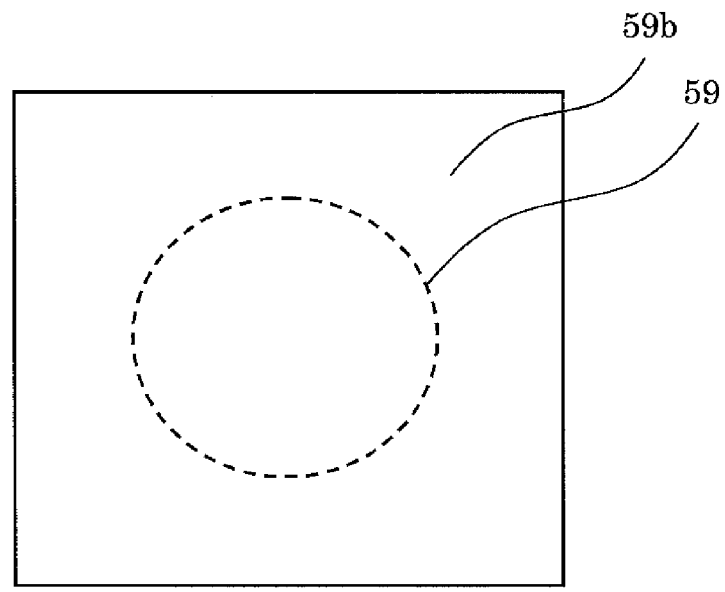
FIG. 12 is a view showing other example of a relevant part of a switchgear according to Embodiment 6 of the present invention.

Embodiment 6 of the present invention will be described with reference to FIG. 12. FIG. 12 is a view showing other example of a relevant part of a switchgear according to Embodiment 6 of the present invention.

In the aforementioned Embodiment 5, the description has been made on the case where the other side 59b of the second heat conductor 59 is in the shape of a circular; however, in Embodiment 6, the other side 59b of a second heat conductor 59 is formed in a square shape, and similar effects to the aforementioned Embodiment 5 can be exhibited.

Embodiment 7.

Figure 13:
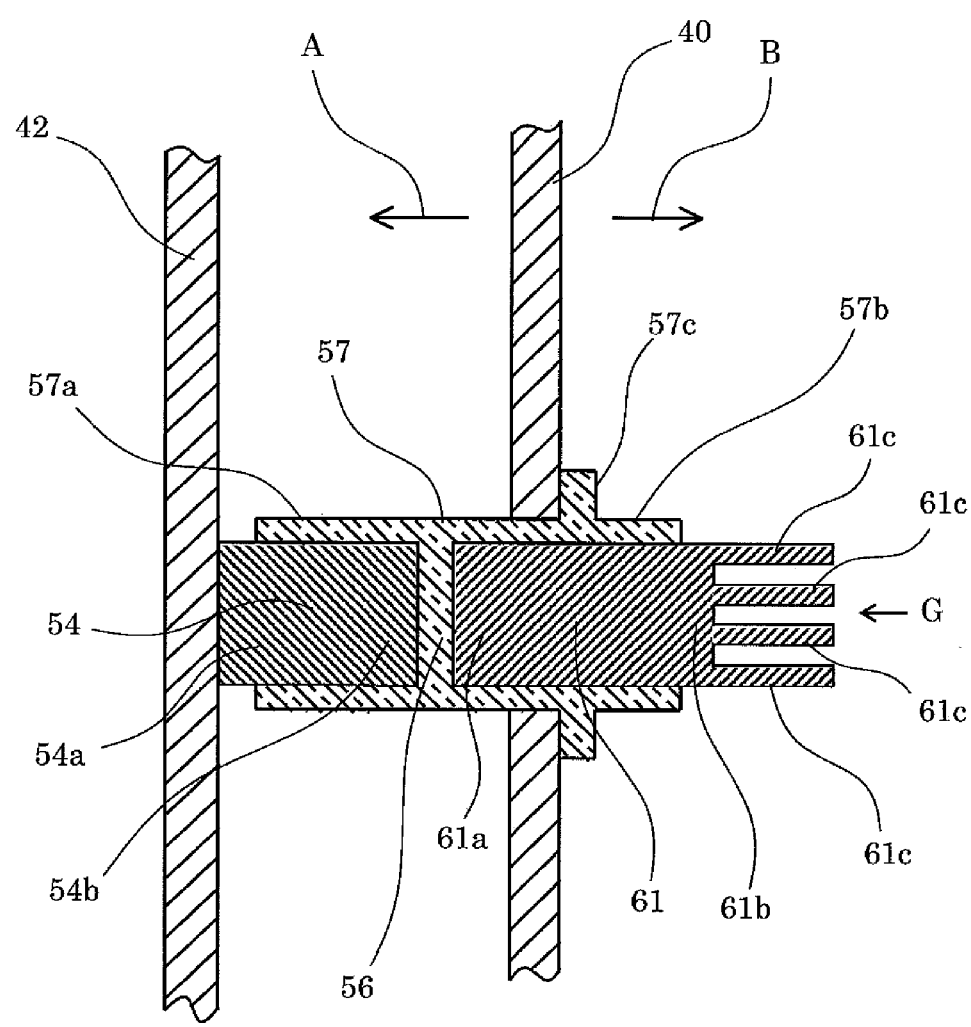
FIG. 13 is a cross-sectional side view showing a relevant part of a switchgear according to Embodiment 7 of the present invention.
Figure 14:
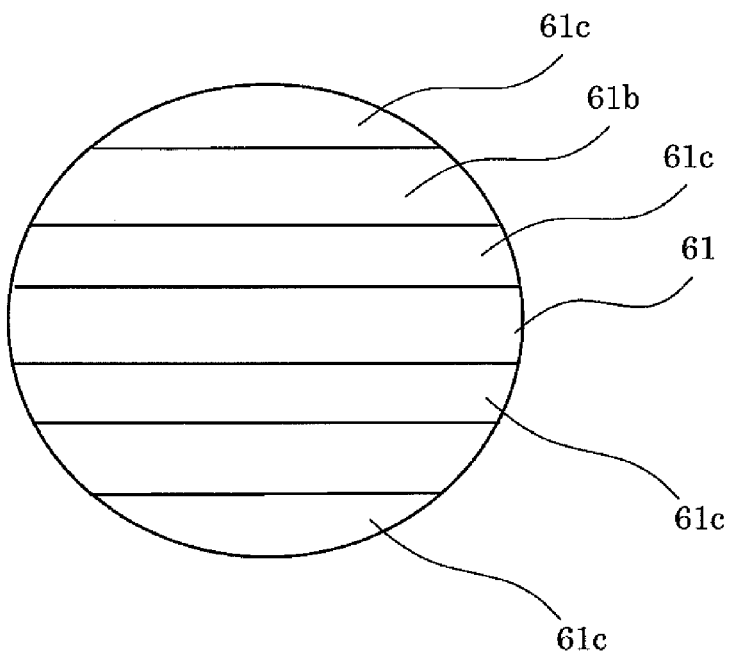
FIG. 14 is a view in which the relevant part of the switchgear according to Embodiment 7 of the present invention is seen from a direction of an arrow G.

Embodiment 7 of the present invention will be described with reference to FIG. 13 and FIG. 14. FIG. 13 is a cross-sectional side view showing a relevant part of a switchgear according to Embodiment 7 of the present invention. FIG. 14 is a view in which the relevant part of the switchgear according to Embodiment 7 of the present invention is seen from a direction of an arrow G.

In Embodiment 7, the end surface of the other side 54b of a first heat conductor 54 and the end surface of one side 61a of a second heat conductor 61 are arranged in face-to-face relation to each other in an axial direction. The other side 61b of the second heat conductor 61 is extended outside an apparatus vessel 40. Then, fin bodies 61c are formed on the end surface of the other side 61b of the second heat conductor 61 extending outside the apparatus vessel 40. The drawing shows the case where a plurality of horizontally formed fin bodies 61c are provided in a vertical direction, as an example.

As described above, in Embodiment 7, a configuration is made such that heat is dissipated by the fin bodies 61c formed on the end surface of the other side 61b of the second heat conductor 61; and accordingly, a large constituent element such as a heat dissipating member 58 does not need to be provided and thus it is possible to obtain a switchgear with a small number of components and good workability.

Embodiment 8.

Figure 15:
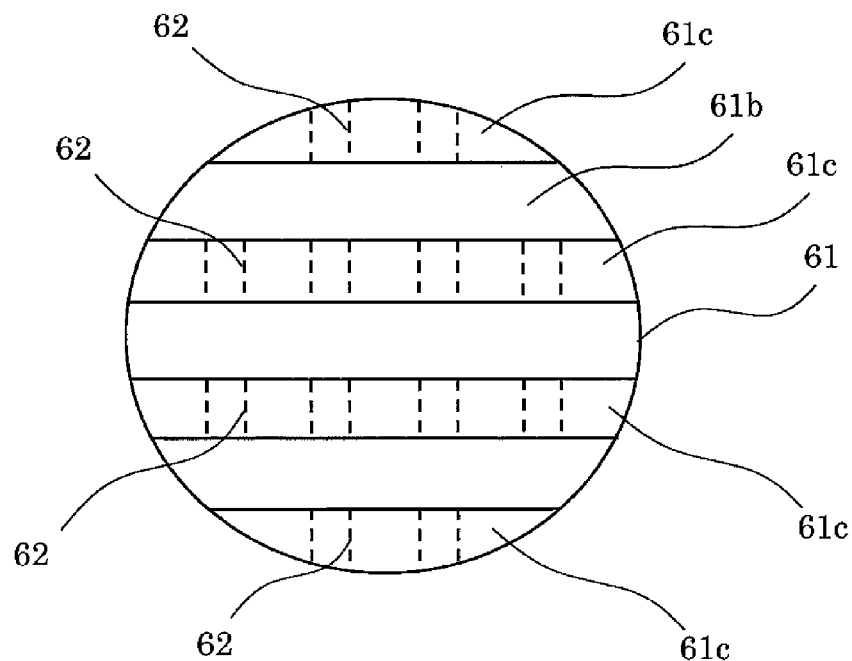
FIG. 15 is a view showing other example of a relevant part of a switchgear according to Embodiment 8 of the present invention.

Embodiment 8 of the present invention will be described with reference to FIG. 15. FIG. 15 is a view showing other example of a relevant part of a switchgear according to Embodiment 8 of the present invention.

In Embodiment 8, through holes 62 are formed perpendicular to fin bodies 61c which are formed on the end surface of the other side 61b of a second heat conductor 61; and accordingly, a surface area can be increased by these through holes 62 and heat dissipation efficiency can be more improved than the aforementioned Embodiment 7.

Embodiment 9.

Figure 16:
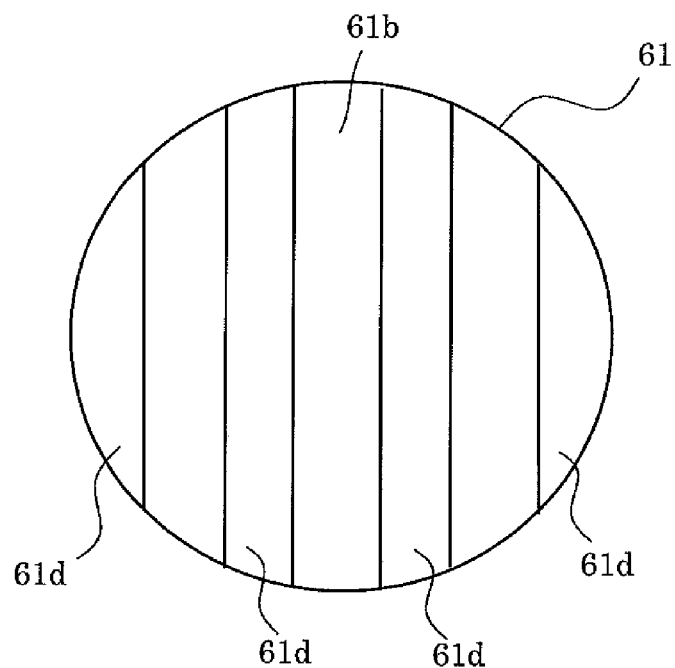
FIG. 16 is a view showing other example of a relevant part of a switchgear according to Embodiment 9 of the present invention.

Embodiment 9 of the present invention will be described with reference to FIG. 16. FIG. 16 is a view showing other example of a relevant part of a switchgear according to Embodiment 9 of the present invention.

In the aforementioned Embodiment 7, the description has been made on the case where the fin bodies 61c formed on the end surface of the other side 61b of the second heat conductor 61 are formed in the horizontal direction; however, in Embodiment 9, fin bodies 61d vertically formed on the end surface of the other side 61b of a second heat conductor 61 are arranged in plural numbers in a horizontal direction.

As described above, in Embodiment 9, a configuration is made such that heat is dissipated by the fin bodies 61d vertically formed on the end surface of the other side 61b of the second heat conductor 61; and accordingly, the enhanced effect of natural convection outside an apparatus vessel 40 is better than the fin bodies 61c horizontally formed in the aforementioned Embodiment 7 and heat dissipation efficiency can be more improved than the aforementioned Embodiment 7.

Embodiment 10.

Figure 17:
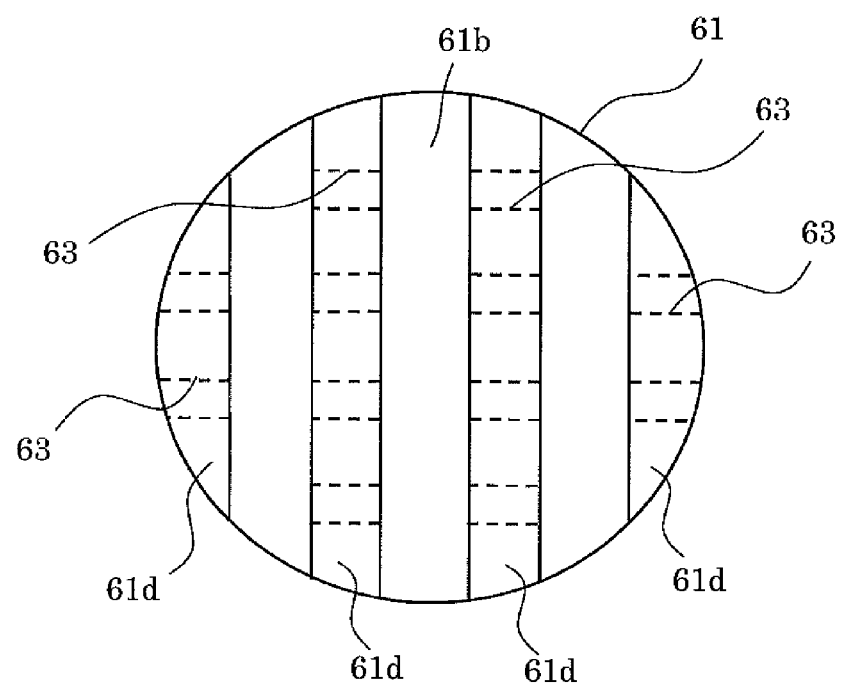
FIG. 17 is a view showing other example of a relevant part of a switchgear according to Embodiment 10 of the present invention.

Embodiment 10 of the present invention will be described with reference to FIG. 17. FIG. 17 is a view showing other example of a relevant part of a switchgear according to Embodiment 10 of the present invention.

In Embodiment 10, through holes 63 which are horizontal to fin bodies 61c formed on the end surface of the other side 61b of a second heat conductor 61 are formed; and accordingly, a surface area can be increased by these through holes 63 and heat dissipation efficiency can be more improved than the aforementioned Embodiment 9.

Embodiment 11.

Figure 18:
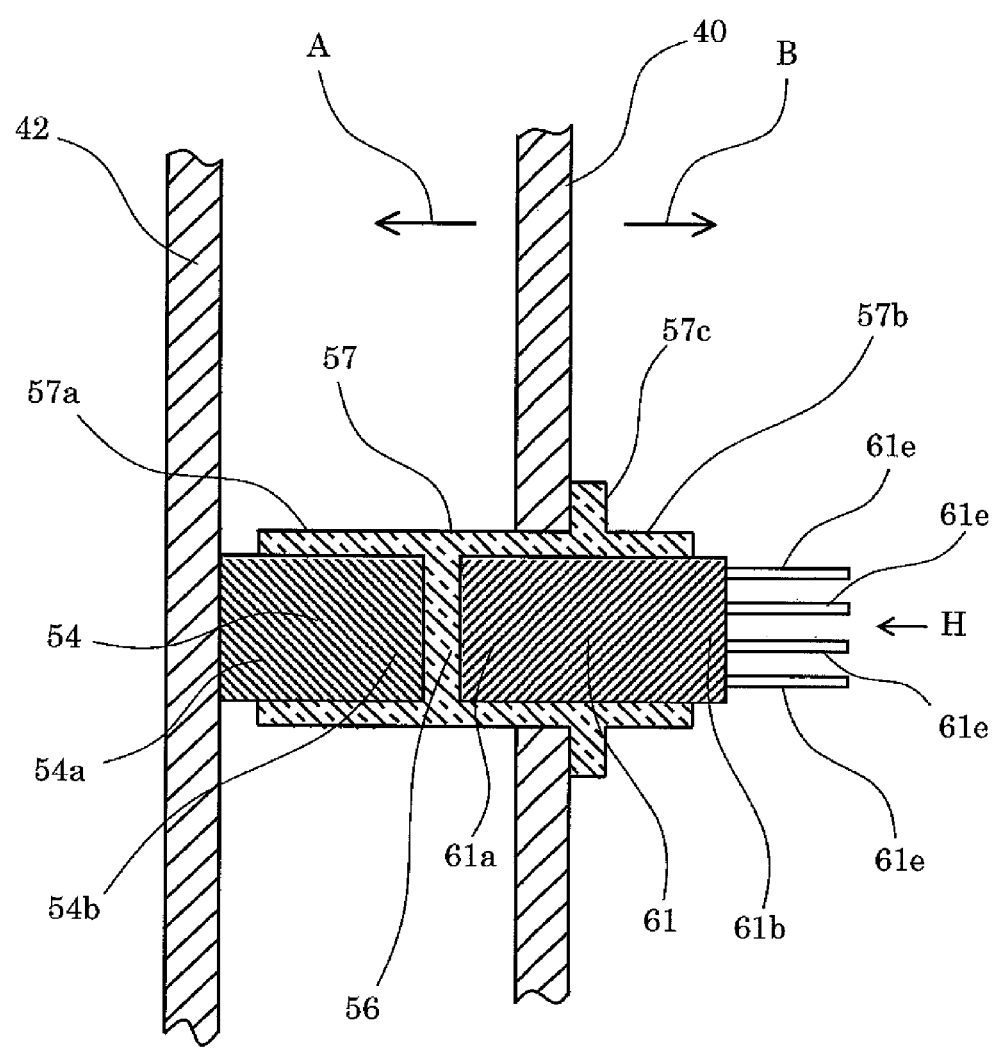
FIG. 18 is a cross-sectional side view showing a relevant part of a switchgear according to Embodiment 11 of the present invention.
Figure 19:
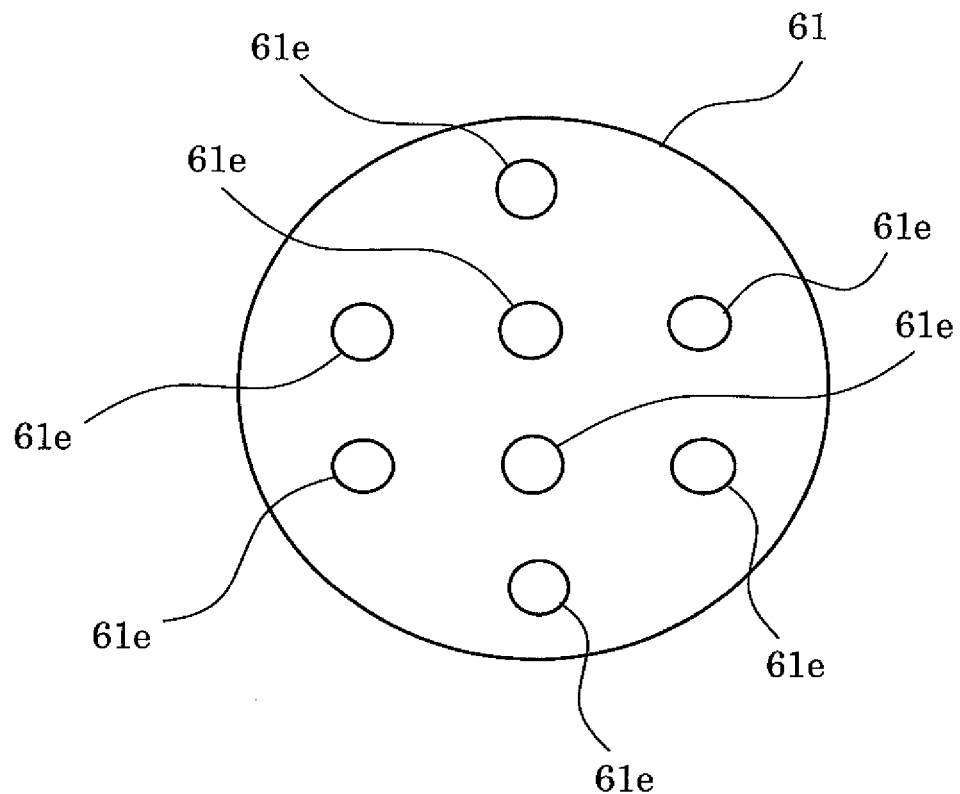
FIG. 19 is a view in which the relevant part of the switchgear according to Embodiment 11 of the present invention is seen from a direction of an arrow H.

Embodiment 11 of the present invention will be described with reference to FIG. 18 and FIG. 19. FIG. 18 is a cross-sectional side view showing a relevant part of a switchgear according to Embodiment 11 of the present invention. FIG. 19 is a view in which the relevant part of the switchgear according to Embodiment 11 of the present invention is seen from a direction of an arrow H.

In Embodiment 11, a plurality of small diameter bar shaped fin bodies 61e are formed at intervals from each other on the end surface of the other side 61b of a second heat conductor 61 extending outside an apparatus vessel 40.

As described above, in Embodiment 11, a configuration is made such that heat is dissipated by the small diameter bar shaped fin bodies 61e formed on the end surface of the other side 61b of the second heat conductor 61; and accordingly, a large constituent element such as a heat dissipating member 58 does not need to be provided and thus it is possible to obtain a switchgear with a small number of components and good workability. Furthermore, spaces are provided between the fin bodies 61e in a horizontal direction and a vertical direction, the enhanced effect of natural convection outside the apparatus vessel 40 is good and heat dissipation efficiency can be improved.

Embodiment 12.

Figure 20:
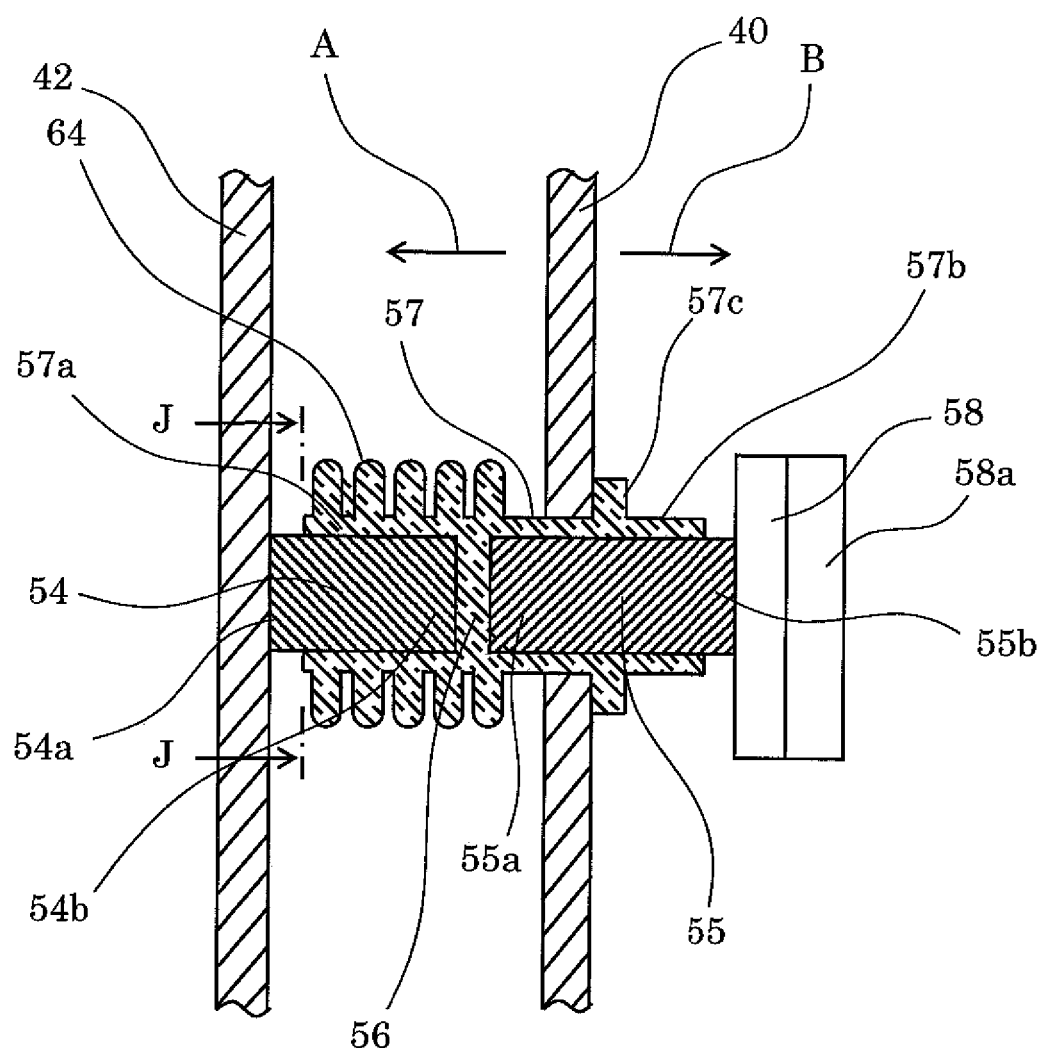
FIG. 20 is a cross-sectional side view showing a relevant part of a switchgear according to Embodiment 12 of the present invention.
Figure 21:
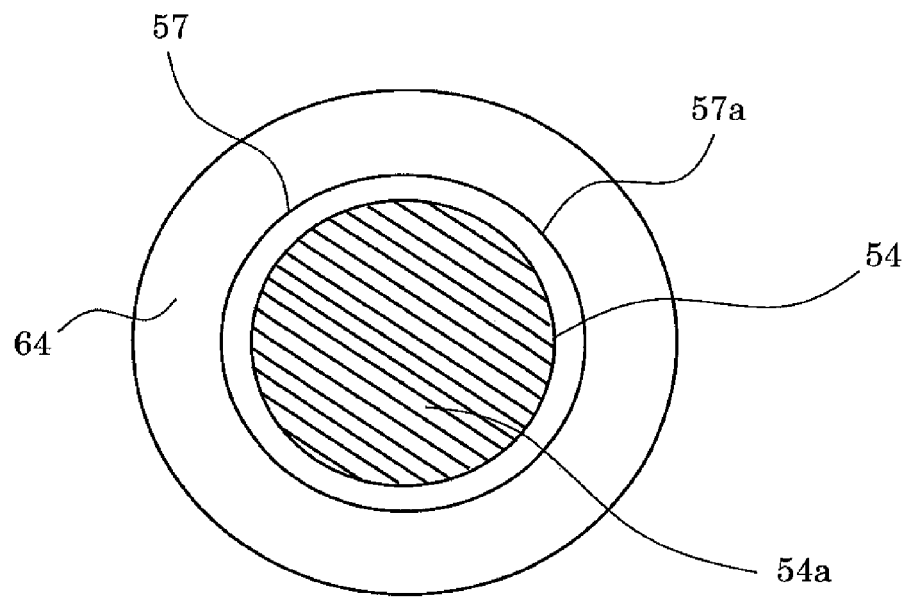
FIG. 21 is a view in which the relevant part of the switchgear according to Embodiment 12 of the present invention is seen from a direction of arrows J-J.

Embodiment 12 of the present invention will be described with reference to FIG. 20 and FIG. 21. FIG. 20 is a cross-sectional side view showing a relevant part of a switchgear according to Embodiment 12 of the present invention. FIG. 21 is a view in which the relevant part of the switchgear according to Embodiment 12 of the present invention is seen from a direction of arrows J-J.

In Embodiment 12, a fin-shaped insulating member 64 configured by, for example, an annular fin is arranged in plural numbers in an axial direction on a peripheral portion of one side 57a of a periphery portion insulating member 57, the fin-shaped insulating members 64 being located in an apparatus vessel 40.

As described above, in Embodiment 12, by the fin-shaped insulating members 64 configured by, for example, the annular fins formed on the peripheral portion of one side 57a of the periphery portion insulating member 57, a heat absorption area of insulating gas in the apparatus vessel 40 can be increased; and thus, heat of the insulating gas is further effectively absorbed and the heat can be dissipated outside the apparatus vessel 40 via a first heat conductor 54, a second heat conductor 55, and a heat dissipating member 58. Heat dissipation performance as the whole switchgear can be further improved.

Therefore, the heat contained in the insulating gas in the apparatus vessel 40 can be further efficiently dissipated along with heat dissipation of high heat generated by a main circuit conductor 42 and heat dissipation performance as the whole switchgear can be further improved.

Embodiment 13.

Figure 22:
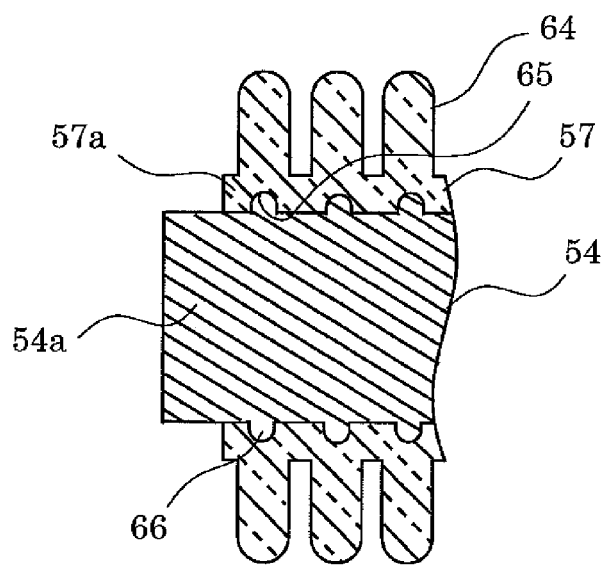
FIG. 22 is a cross-sectional side view showing a relevant part of a switchgear according to Embodiment 13 of the present invention.

Embodiment 13 of the present invention will be described with reference to FIG. 22. FIG. 22 is a cross-sectional side view showing a relevant part of a switchgear according to Embodiment 13 of the present invention.

In Embodiment 13, concave portions 65 having, for example, an annular shape are formed on the inner side of fin-shaped insulating members 64 configured by, for example, annular fins formed on a peripheral portion of one side 57a of a periphery portion insulating member 57; and, convex portions 66 having, for example, an annular shape are formed on the periphery of a first heat conductor 54, the annular convex portions 66 being to be fitted to, for example, the annular concave portions 65 formed on the inner side of the fin-shaped insulating members 64 configured by the annular fins.

As described above, in Embodiment 13, for example, the annular concave portions 65 formed on the inner side of the fin-shaped insulating members 64 configured by the annular fins formed on the peripheral portion of one side 57a of the periphery portion insulating member 57 and, for example, the annular convex portions 66 formed on the periphery of the first heat conductor 54 are made to fit; and accordingly, a contact area therebetween can be increased. Therefore, heat conduction efficiency from the fin-shaped insulating members 64 to the first heat conductor 54 can be further enhanced and heat dissipation effect can be more enhanced than the aforementioned Embodiment 12.

Embodiment 14.

Figure 23:
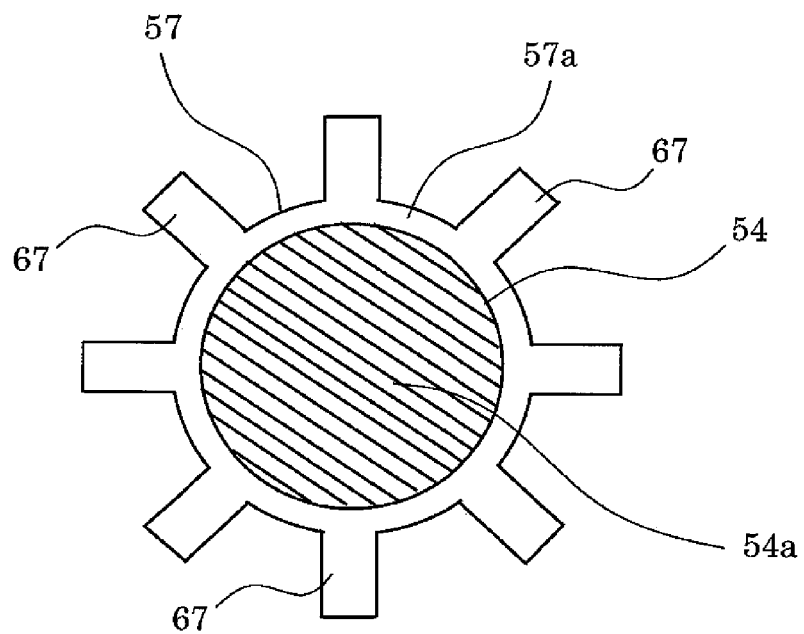
FIG. 23 is a view showing other example of a relevant part of a switchgear according to Embodiment 14 of the present invention.

Embodiment 14 of the present invention will be described with reference to FIG. 23. FIG. 23 is a view showing other example of a relevant part of a switchgear according to Embodiment 14 of the present invention.

In the aforementioned Embodiment 12, the description has been made on the case where the fin-shaped insulating members 64 configured by the annular fins formed on the peripheral portion of one side 57a of the periphery portion insulating member 57 are provided; however, in Embodiment 14, fin-shaped insulating members 67 configured by radiated fins extending in an axial direction are formed on a peripheral portion of one side 57a of a periphery portion insulating member 57.

In also Embodiment 14, the heat absorption effect of insulating gas in an apparatus vessel 40 can be obtained by the fin-shaped insulating members 67 configured by the radiated fins and similar effects to Embodiment 12 can be exhibited.

Embodiment 15.

Figure 24:
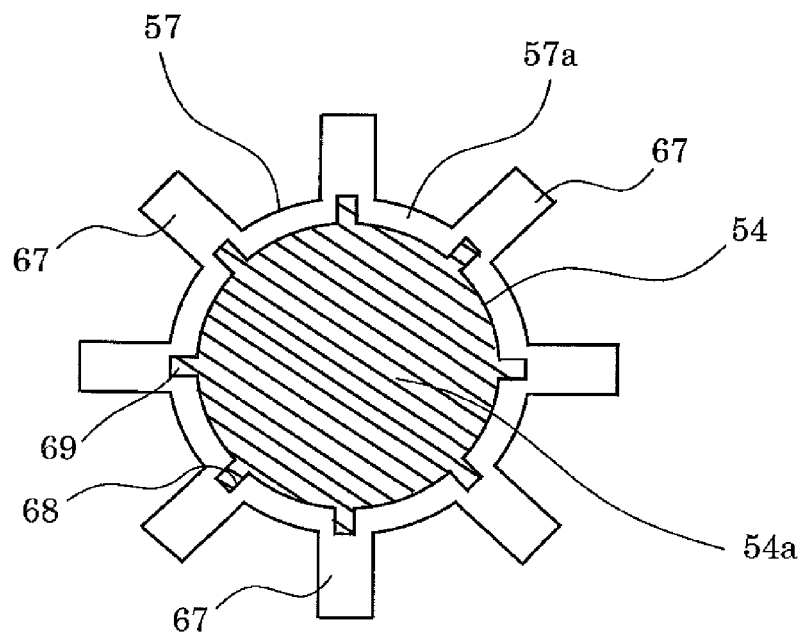
FIG. 24 is a view showing other example of a relevant part of a switchgear according to Embodiment 15 of the present invention.

Embodiment 15 of the present invention will be described with reference to FIG. 24. FIG. 24 is a view showing other example of a relevant part of a switchgear according to Embodiment 15 of the present invention.

In Embodiment 15, concave portions 68, for example, extending in an axial direction are formed on the inner side of fin-shaped insulating members 67 configured by radiated fins formed on a peripheral portion of one side 57a of a periphery portion insulating member 57; and, convex portions 69, for example, extending in the axial direction are formed on the periphery of the first heat conductor 54, the convex portions 69 being to be fitted to the concave portion 68, for example, extending in the axial direction and formed on the inner side of the fin-shaped insulating members 67 configured by the radiated fins.

As described above, in Embodiment 15, the concave portions 68, for example, extending in the axial direction and formed on the inner side of the fin-shaped insulating members 67 configured by the radiated fins formed on the peripheral portion of one side 57a of the periphery portion insulating member 57 and the convex portions 69, for example, extending in the axial direction and formed on the periphery of the first heat conductor 54 are made to fit; and accordingly, a contact area therebetween can be increased. Therefore, heat conduction efficiency from the fin-shaped insulating member 67 to the first heat conductor 54 can be further enhanced and heat dissipation effect can be more enhanced than the aforementioned Embodiment 14.

Embodiment 16.

Figure 25:
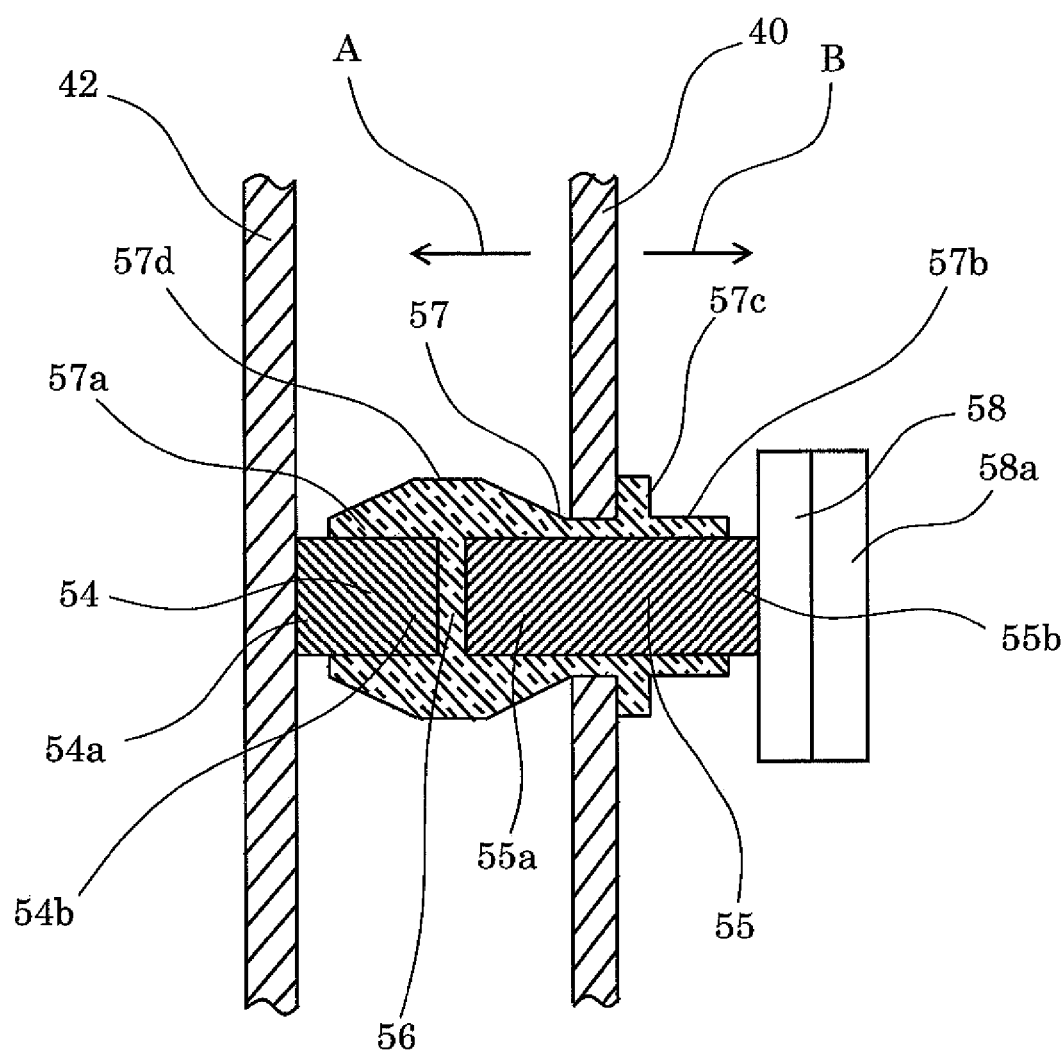
FIG. 25 is a cross-sectional side view showing a relevant part of a switchgear according to Embodiment 16 of the present invention.

Embodiment 16 of the present invention will be described with reference to FIG. 25. FIG. 25 is a cross-sectional side view showing a relevant part of a switchgear according to Embodiment 16 of the present invention.

In Embodiment 16, the thickness of a part 57d of a periphery portion insulating member 57, the part 57d being positioned around an insulating member between conductors 56, is configured to be thicker than other part. That is, the diameter of the part 57d of the periphery portion insulating member 57, the diameter of the part 57d being positioned around the insulating member between conductors 56, is larger than the diameter of other part.

As described above, in Embodiment 16, the diameter of the part 57d of the periphery portion insulating member 57, the diameter of the part 57d being positioned around the insulating member between conductors 56, is larger than the diameter of other part; and accordingly, a sectional area of the part around the insulating member between conductors 56 can be increased and heat conduction efficiency can be further enhanced.

Embodiment 17.

Figure 26:
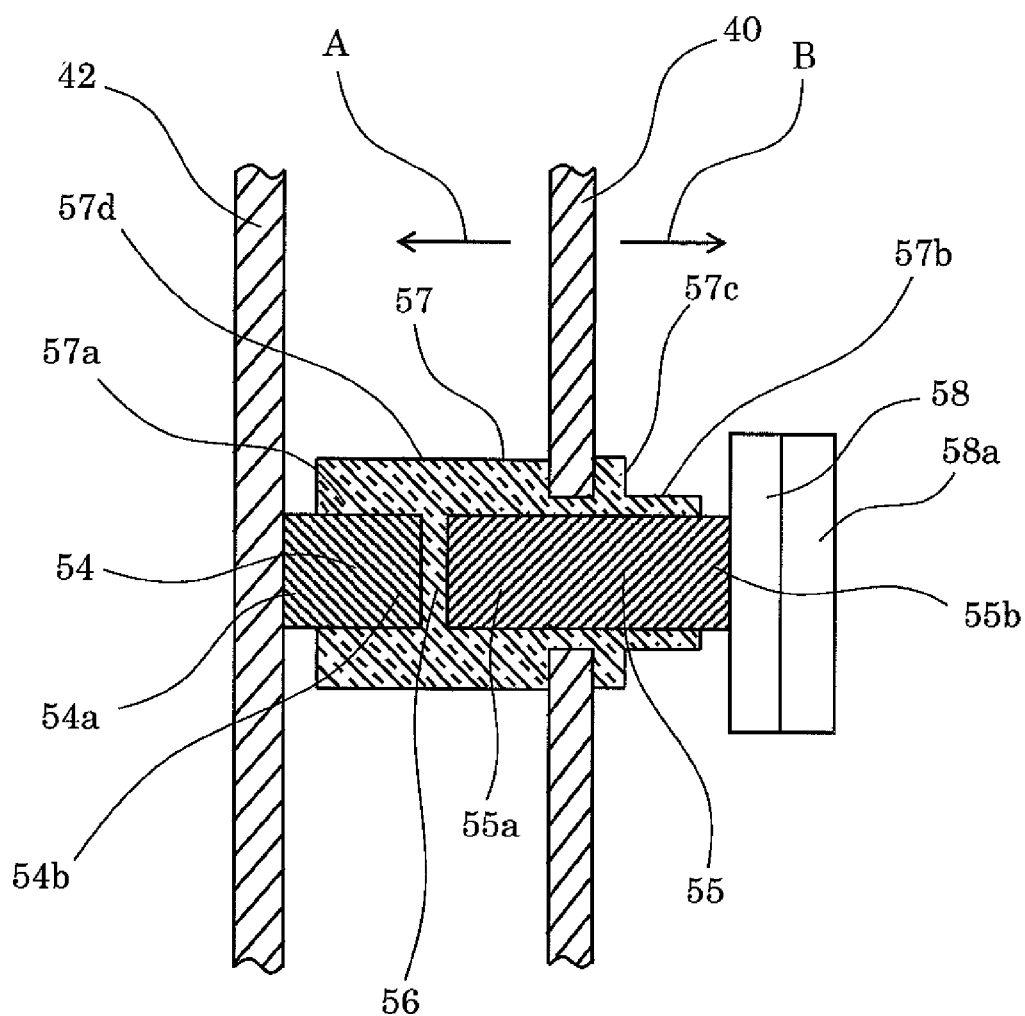
FIG. 26 is a cross-sectional side view showing a relevant part of a switchgear according to Embodiment 17 of the present invention.

Embodiment 17 of the present invention will be described with reference to FIG. 26. FIG. 26 is a cross-sectional side view showing a relevant part of a switchgear according to Embodiment 17 of the present invention.

In Embodiment 17, not only the diameter of a part 57d of a periphery portion insulating member 57, the part 57d being positioned around an insulating member between conductors 56, is larger than the diameter of other part, but also a part of the periphery portion insulating member 57 located in an apparatus vessel 40 is also larger; and accordingly, similar effects to the aforementioned Embodiment 16 can be exhibited.

Embodiment 18.

By the way, in the aforementioned respective Embodiments, the description has been made on the cases where the first heat conductor and the second heat conductor are each in the shape of a round bar, but not limited thereto; for example, a square bar shape is permissible and similar effects to the aforementioned Embodiments can be exhibited.

Embodiment 19.

Figure 27:
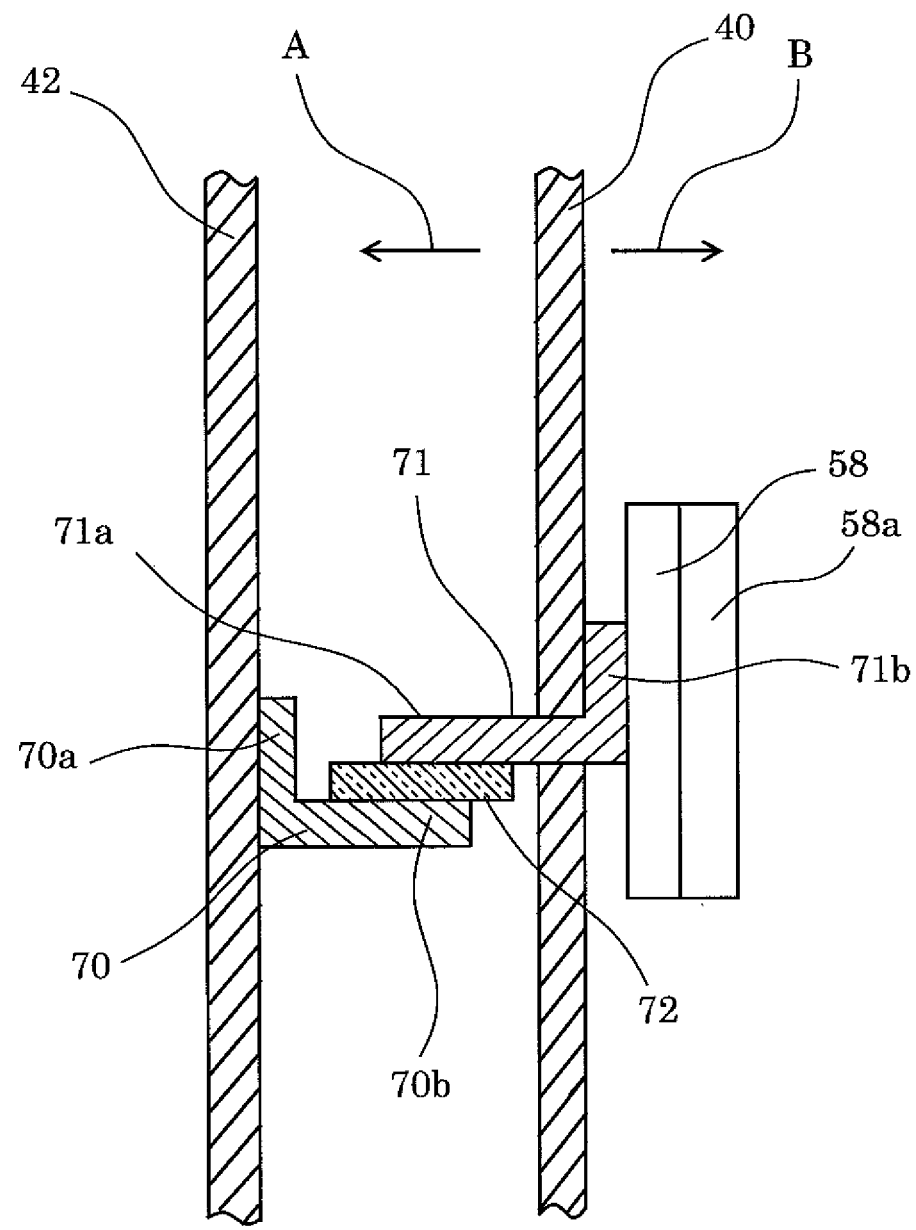
FIG. 27 is a cross-sectional side view showing a relevant part of a switchgear according to Embodiment 19 of the present invention.

Embodiment 19 of the present invention will be described with reference to FIG. 26. FIG. 27 is a cross-sectional side view showing a relevant part of a switchgear according to Embodiment 19 of the present invention.

In Embodiment 19, the switchgear includes: a first heat conductor 70 in which one side 70a is connected to, for example, a main circuit conductor 42 serving as a heat generation portion of an apparatus vessel 40 and the other side 70b is extended toward the apparatus vessel 40 side; a second heat conductor 71 in which one side 71a is disposed near the other side 70b of the first heat conductor 70, that is, disposed, for example, in the upper side of the other side 70b and the other side 71b is extended outside the apparatus vessel 40; and an insulating member between conductors 72 disposed between the other side 70b of the first heat conductor 70 and one side 71a of the second heat conductor 71. Furthermore, the other side 71b of the second heat conductor 71 is formed to be a large shape; and accordingly, heat dissipation effect to outside the apparatus vessel 40 can be enhanced. Further, in Embodiment 19, a heat dissipating member 58 having a fin body 58a extending in a vertical direction is provided on the other side 71b of the second heat conductor 71.

In the aforementioned respective Embodiments, the description has been made on the case where the first heat conductor and the second heat conductor are coaxially arranged; however, in Embodiment 19, one side 71a of the second heat conductor 71 is disposed in the upper side of the other side 70b of the first heat conductor 70, that is, one side 71a of the second heat conductor 71 and the other side 70b of the first heat conductor 70 are arranged in the vertical direction; and accordingly, similar effects to the case where the first heat conductor and the second heat conductor are coaxially arranged can be exhibited.

Embodiment 20.

Embodiment 20 of the present invention will be described with reference to FIG. 28 to FIG. 31. Each of the drawings is a cross-sectional view showing a heat conductor in a switchgear according to Embodiment 20 of the present invention.

Figure 28:
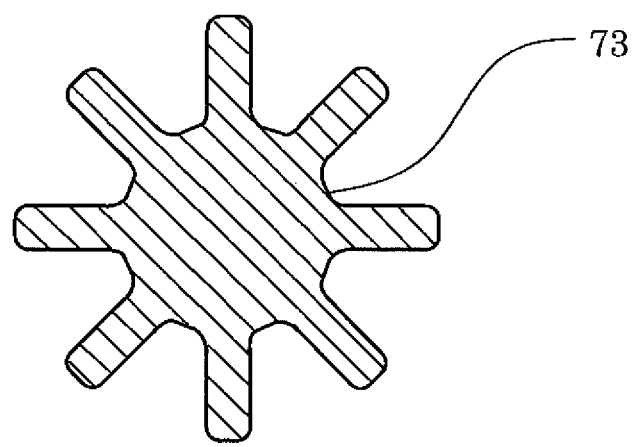
FIG. 28 is a cross-sectional view showing a heat conductor in a switchgear according to Embodiment 20 of the present invention.
Figure 29:
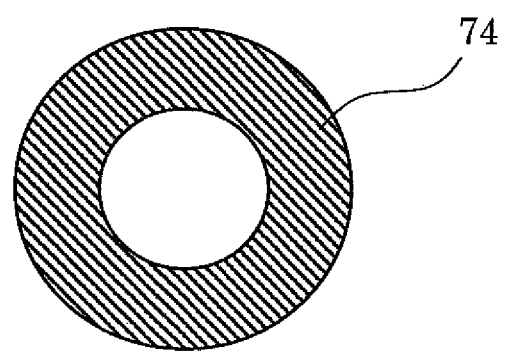
FIG. 29 is a cross-sectional view showing other example of a heat conductor in the switchgear according to Embodiment 20 of the present invention.
Figure 30:
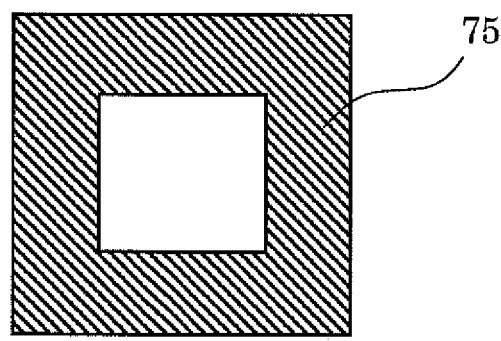
FIG. 30 is a cross-sectional view showing other example of a heat conductor in the switchgear according to Embodiment 20 of the present invention.
Figure 31:
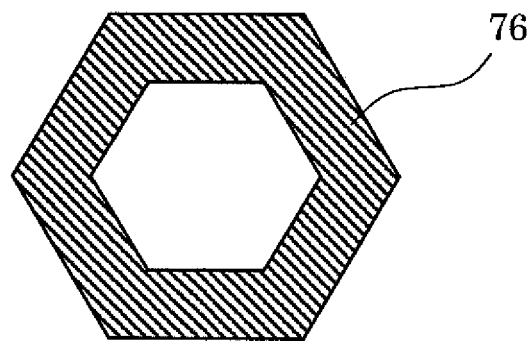
FIG. 31 is a cross-sectional view showing other example of a heat conductor in the switchgear according to Embodiment 20 of the present invention.

By the way, in the aforementioned respective Embodiments, the heat conductor is formed in the shape of a round bar or a square bar, but not limited thereto. FIG. 28 shows a heat conductor 73 formed in a radiated shape in cross section, FIG. 29 shows a heat conductor 74 formed in a cylindrical shape, FIG. 30 shows a heat conductor 75 formed in a square tube shape, and FIG. 31 shows a heat conductor 76 formed in a hexagonal tubular shape; and similar effects to the aforementioned respective Embodiments can be exhibited.

Embodiment 21.

Figure 32:
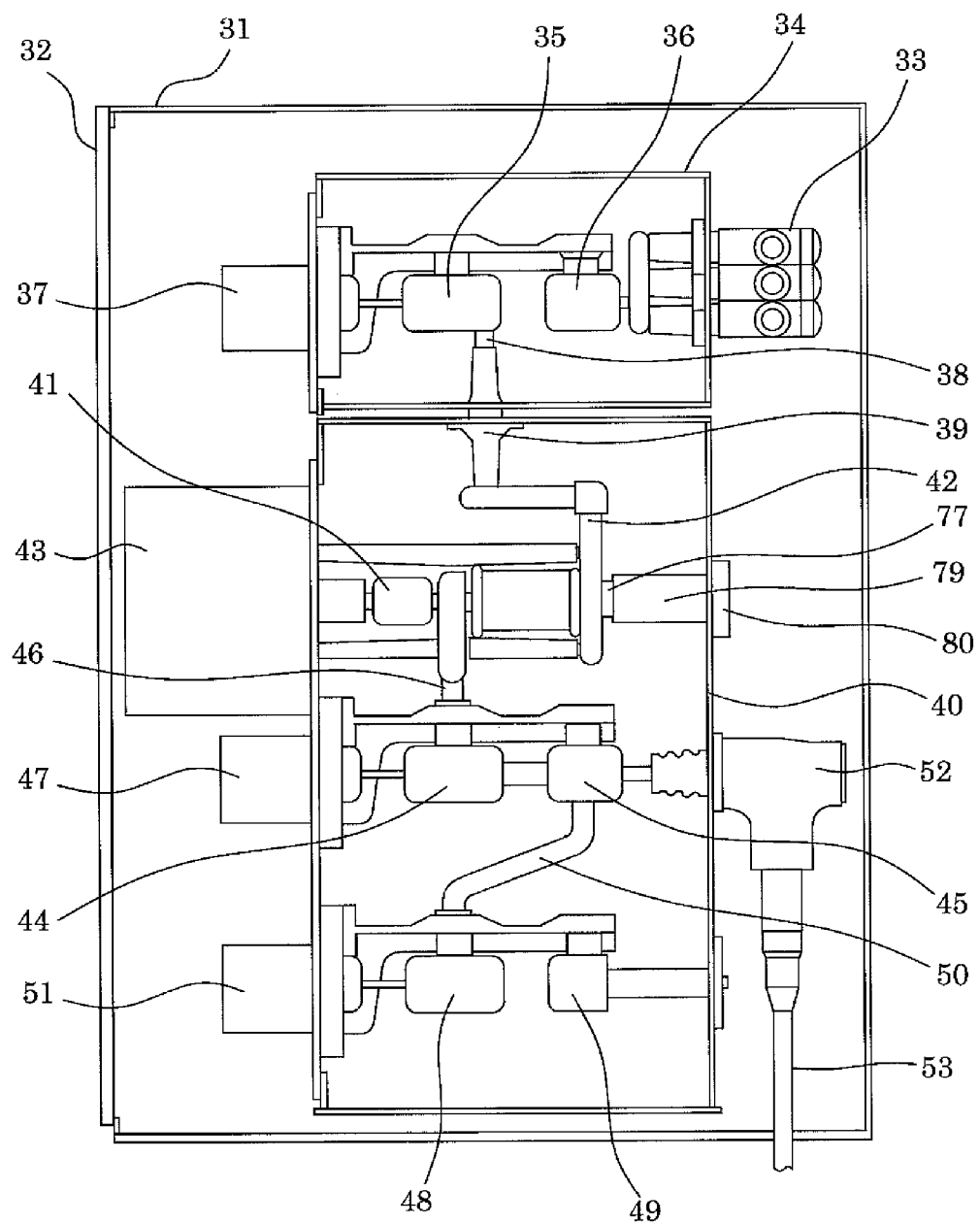
FIG. 32 is a side view showing a switchgear according to Embodiment 21 of the present invention.
Figure 33:
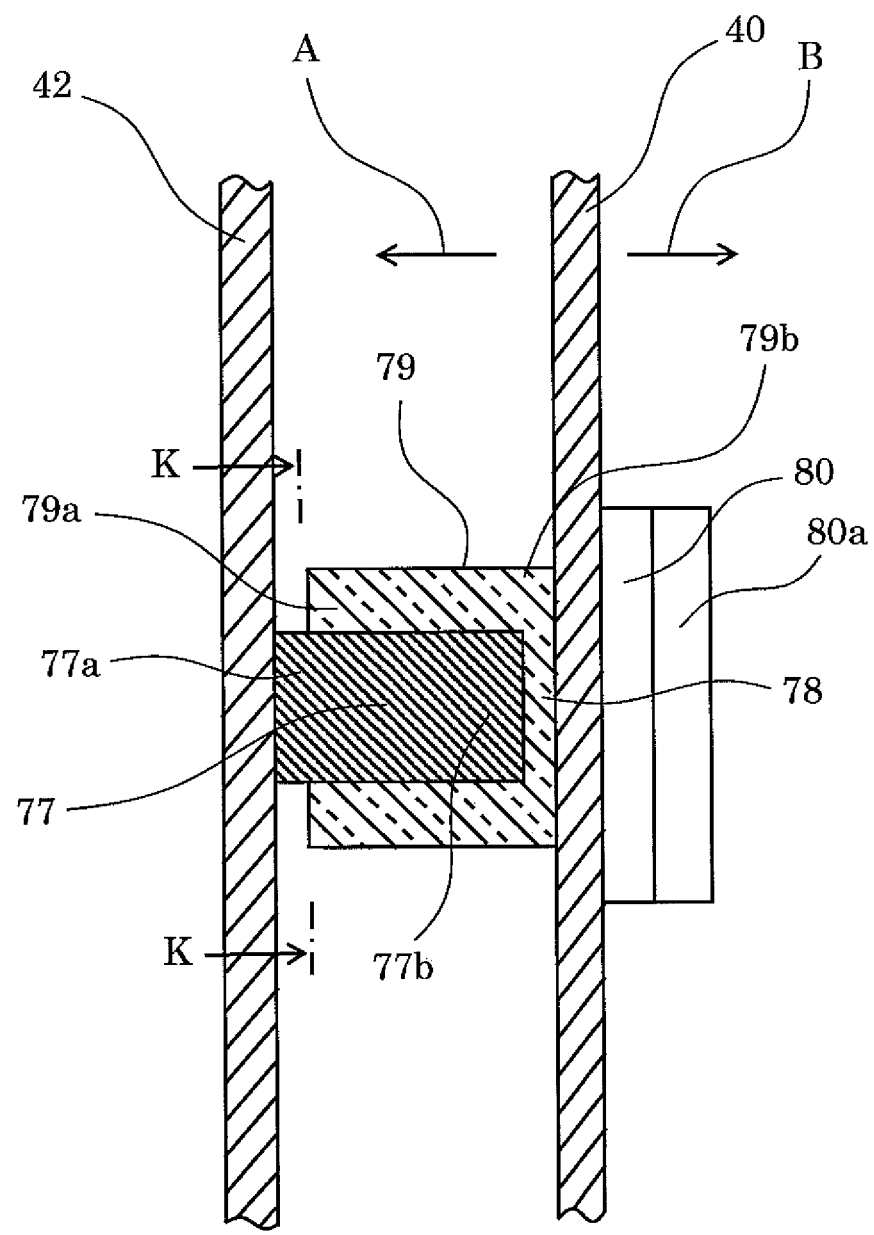
FIG. 33 is a cross-sectional side view showing a relevant part of the switchgear according to Embodiment 21 of the present invention.
Figure 34:
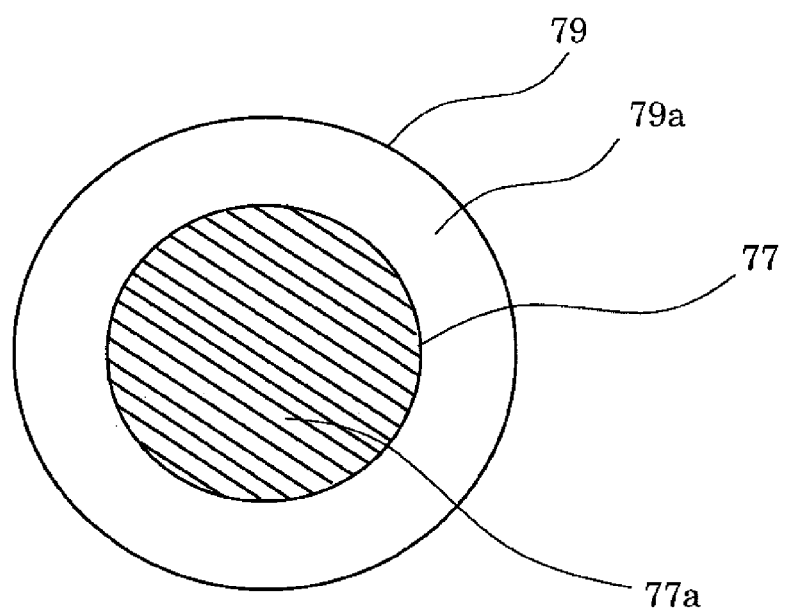
FIG. 34 is a view in which the relevant part of the switchgear according to Embodiment 21 of the present invention is seen from a direction of arrows K-K.
Figure 35:
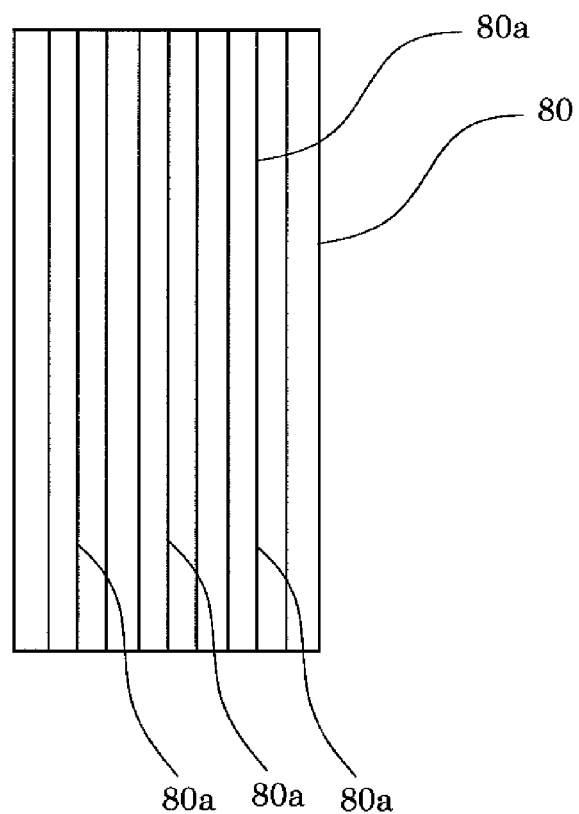
FIG. 35 is a front view showing a heat dissipating member of the switchgear according to Embodiment 21 of the present invention.
Figure 36:
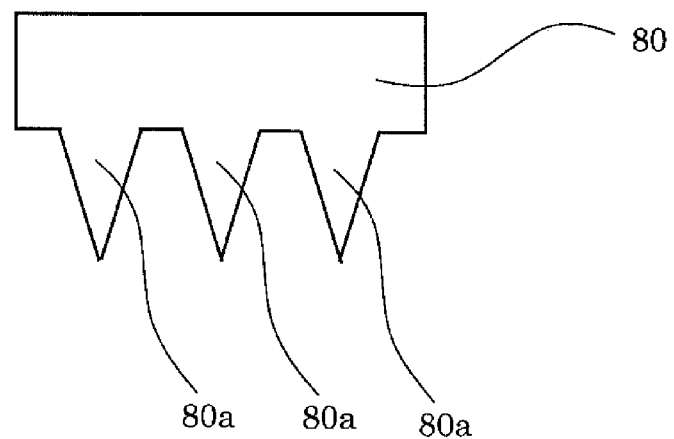
FIG. 36 is a plan view showing the heat dissipating member of the switchgear according to Embodiment 21 of the present invention.

Hereinafter, Embodiment 21 of the present invention will be described with reference to FIG. 32 to FIG. 36. FIG. 32 is a side view showing a switchgear according to Embodiment 21 of the present invention. FIG. 33 is a cross-sectional side view showing a relevant part of the switchgear according to Embodiment 21 of the present invention. FIG. 34 is a view in which the relevant part of the switchgear according to Embodiment 21 of the present invention is seen from a direction of arrows K-K. FIG. 35 is a front view showing a heat dissipating member of the switchgear according to Embodiment 21 of the present invention. FIG. 36 is a plan view showing the heat dissipating member of the switchgear according to Embodiment 21 of the present invention.

In these respective drawings, a reference numeral 31 denotes a housing of the switchgear equipped with a high voltage electrical apparatus such as a gas insulated switchgear placed in a vessel filled with insulating gas such as SF6 gas together with electrical apparatuses and high voltage conductors; and an openable and closable exterior panel 32 is provided on the front side of the housing 31. 33 denotes a bus bar attached to a vessel 34 in the upper side in the housing 31. 35 and 36 denote a grounding switch and a disconnecting switch, both of which are attached to the vessel 34; and switching operation is performed by an operating mechanism unit 37. 38 denotes a connection conductor passing through a bushing 39 and passing into an apparatus vessel 40 disposed under the vessel 34.

The apparatus vessel 40 is filled with insulating gas such as SF6 gas, dry air, nitrogen gas, air, or the like and is in an insulating gas atmosphere. A circuit breaker 41 is placed in the apparatus vessel 40 and is electrically connected to the connection conductor 38 by a main circuit conductor 42 serving as a high voltage conductor. 43 denotes an operating mechanism unit of the circuit breaker 41. 44 and 45 denote a grounding switch and a disconnecting switch, both of which are placed below the circuit breaker 41 in the apparatus vessel 40 and are connected to the circuit breaker 41 by connection conductors 46; and switching operation is performed by an operating mechanism unit 47.

48 and 49 denote a grounding switch and a lightning arrester, both of which are placed below the grounding switch 44 and the disconnecting switch 45 in the apparatus vessel 40 and are connected to the disconnecting switch 45 by connection conductors 50; and switching operation of the grounding switch 48 is performed by an operating mechanism unit 51 to perform connection/disconnection operation of the lightning arrester 49. 52 denotes a cable head of a cable 53 and the cable head 52 is connected to the disconnecting switch 45.

77 denotes a heat conductor disposed in the apparatus vessel 40, for example, shown by an arrow A; one side 77a of the heat conductor 77 is connected to a heat generation portion of the apparatus vessel 40, for example, connected to a main circuit conductor 42 as an example in the drawing, and the other side 77b is extended toward the apparatus vessel 40 side; and the heat conductor 77 is made of, for example, copper or aluminum that is excellent in high heat conductivity. Furthermore, the drawing shows the case where the heat conductor 77 is formed in a round bar shape, as an example.

78 denotes an insulating member disposed between the end surface of the other side 77b of the heat conductor 77 and an inner wall of the apparatus vessel 40 and is made of resin that is excellent in high heat conductivity, which provides electrical insulation between the heat conductor 77 and the apparatus vessel 40 and can efficiently transfer heat of the heat conductor 77 to the apparatus vessel 40.

79 denotes a periphery portion insulating member which is formed, for example, in a cylindrical shape and is disposed by striding over the periphery of the heat conductor 77 and the periphery of the insulating member 78. The periphery portion insulating member 79 can further enhance electrical insulation performance between the heat conductor 77 and the apparatus vessel 40 and has electrical insulation performance between the heat conductor 77 and the apparatus vessel 40. Furthermore, one side 79a of the periphery portion insulating member 79 is extended near the main circuit conductor 42 and the other side 79b is integrally configured with the insulating member 78. Incidentally, the periphery portion insulating member 79 is made of resin that is excellent in high heat conductivity; and accordingly, for example, heat of the insulating gas in the apparatus vessel 40 is absorbed and conducted to the heat conductor 77 and the heat of the heat conductor 77 can be dissipated outside the apparatus vessel 40.

80 denotes a heat dissipating member which is attached to an outer wall of an apparatus vessel 40 opposite to the end surface of the other side 77b of the heat conductor 77 and has a fin body 80a extending in a vertical direction.

Next, operation will be described. In the switchgear of Embodiment 21, heat generated in the current conducting portion, for example, high heat generated by the main circuit conductor 42 serving as a high temperature portion in the apparatus vessel 40 is directly conducted to one side 77a of the heat conductor 77 and conducted to the other side 77b of the heat conductor 77. The high heat which is generated by the main circuit conductor 42 and conducted to the other side 77b of the heat conductor 77 is conducted to the apparatus vessel 40 through the insulating member 78 made of resin that is excellent in high heat conductivity; and the heat is dissipated outside the apparatus vessel 40 through the heat dissipating member 80 which is attached to the outer wall of the apparatus vessel 40 opposite to the end surface of the other side 77b of the heat conductor 77.

In Embodiment 21, the heat generated in the current conducting portion, for example, the high heat generated by the main circuit conductor 42 serving as the high temperature portion of the apparatus vessel 40 is not transferred by heat exchange by indirect heat transfer by natural convection through the insulating gas in the apparatus vessel 40 as in the aforementioned conventional switchgear; but, the high heat is dissipated outside the apparatus vessel 40 by direct heat conduction by the heat conductor 77. Accordingly, it is possible to obtain a switchgear which can simplify a structure, achieve good heat transfer efficiency, and remarkably improve heat dissipation performance without arranging the plurality of the heat dissipating fins 21,22 as in the aforementioned conventional switchgear. Furthermore, the inside of the apparatus vessel 40 can be efficiently cooled; and reduction of the heat dissipating fins or the like, reduction in sectional area of the main circuit conductor 42, and reduction in size of the apparatus vessel 40 can be achieved.

Furthermore, in Embodiment 21 of the present invention, the heat is dissipated by direct heat conduction by the heat conductor 77; and therefore, a driving unit for a fan or the like and a refrigerant for use in a heat pipe or the like are not necessary and thus heat dissipation performance with high reliability can be obtained. Further, the heat conductor 77 is insulated from the apparatus vessel 40 by the insulating member 78 and the periphery portion insulating member 79; and therefore, the heat conductor 77 can be used as an antenna of an electroscope or a partial discharge detector.

By the way, the periphery portion insulating member 79 is disposed from the other side 77b of the periphery of the heat conductor 77 to near one side 77a; and accordingly, electrical insulation performance between the heat conductor 77 and the apparatus vessel 40 can be further enhanced. Furthermore, the periphery portion insulating member 79 is made of resin that is excellent in high heat conductivity; and accordingly, for example, the heat of the insulating gas in the apparatus vessel 40 is absorbed and conducted to the heat conductor 77, and the conducted heat of the heat conductor 77 can be dissipated outside the apparatus vessel 40. In addition, the heat conducted from the heat conductor 77 to the outer wall of the apparatus vessel 40 can be dissipated, because the outer wall of the apparatus vessel 40 also serves as a heat dissipating member. As a result, heat dissipation performance as the whole switchgear can be further improved.

Embodiment 22.

Figure 37:
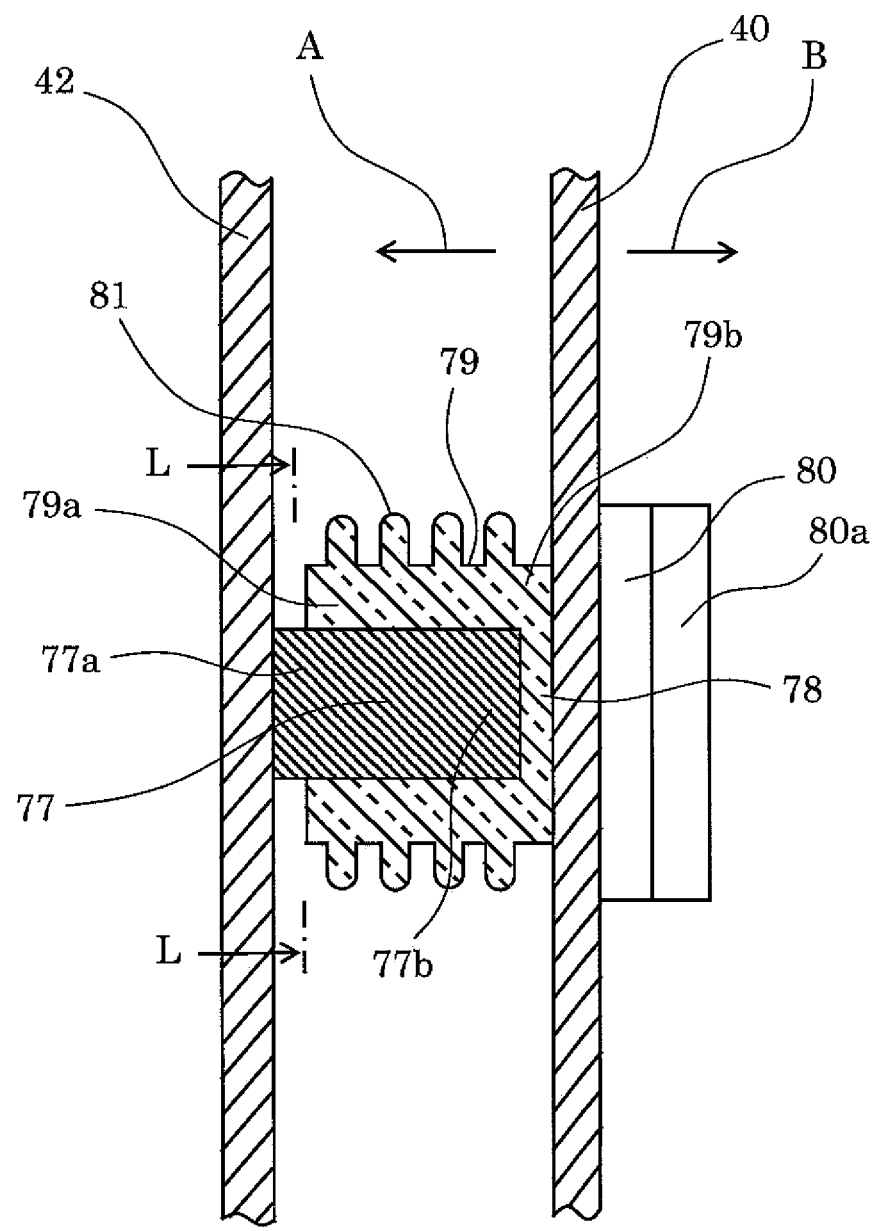
FIG. 37 is a cross-sectional side view showing a relevant part of a switchgear according to Embodiment 22 of the present invention.
Figure 38:
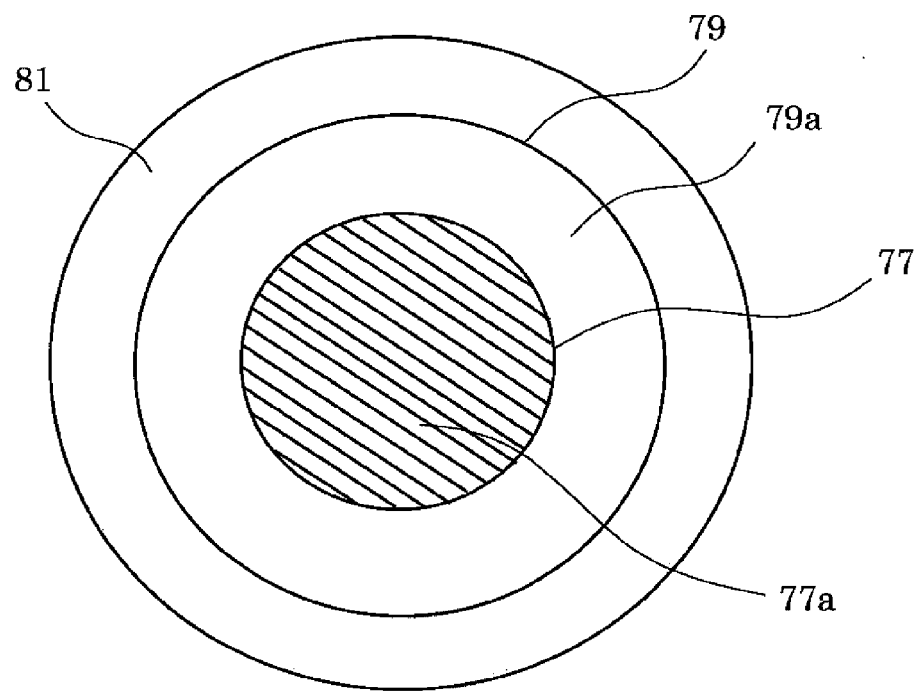
FIG. 38 is a view in which the relevant part of the switchgear according to Embodiment 22 of the present invention is seen from a direction of arrows L-L.

Embodiment 22 of the present invention will be described with reference to FIG. 37 and FIG. 38. FIG. 37 is a cross-sectional side view showing a relevant part of a switchgear according to Embodiment 22 of the present invention. FIG. 38 is a view in which the relevant part of the switchgear according to Embodiment 22 of the present invention is seen from a direction of arrows L-L.

In Embodiment 22, a fin-shaped insulating member 81 configured by, for example, an annular fin is arranged in plural numbers in an axial direction on a peripheral portion of a periphery portion insulating member 79, the fin-shaped insulating members 81 being located in an apparatus vessel 40.

As described above, in Embodiment 22, by the fin-shaped insulating member 81 configured by, for example, the annular fins formed on the peripheral portion of the periphery portion insulating member 79, a heat absorption area of insulating gas in the apparatus vessel 40 can be increased; and thus, heat of the insulating gas is further effectively absorbed and the heat can be dissipated outside the apparatus vessel 40 via a heat conductor 77, an outer wall of the apparatus vessel 40, and a heat dissipating member 80. As a result, heat dissipation performance as the whole switchgear can be further improved.

Therefore, the heat contained in the insulating gas in the apparatus vessel 40 can be further efficiently dissipated along with heat dissipation of high heat generated by a main circuit conductor 42 and heat dissipation performance as the whole switchgear can be further improved.

Embodiment 23.

Figure 39:
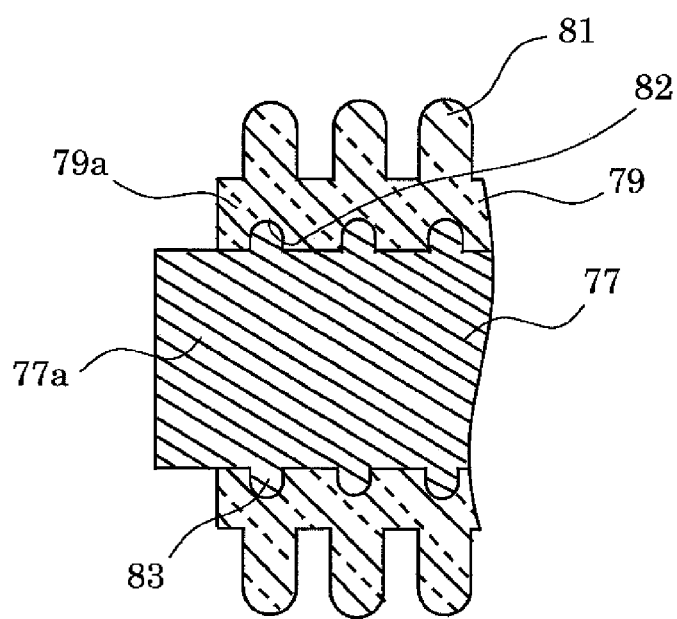
FIG. 39 is a cross-sectional side view showing a relevant part of a switchgear according to Embodiment 23 of the present invention.

Embodiment 23 of the present invention will be described with reference to FIG. 39. FIG. 39 is a cross-sectional side view showing a relevant part of a switchgear according to Embodiment 23 of the present invention.

In Embodiment 23, concave portions 82 having, for example, an annular shape are formed on the inner side of fin-shaped insulating members 81 configured by, for example, annular fins formed on a peripheral portion of a periphery portion insulating member 79; and, convex portions 83 having, for example, an annular shape are formed on the periphery of a heat conductor 77, the annular convex portions 83 being to be fitted to, for example, the annular concave portions 82 formed on the inner side of the fin-shaped insulating members 81 configured by the annular fins.

As described above, in Embodiment 23, for example, the annular concave portions 82 formed on the inner side of the fin-shaped insulating members 81 configured by the annular fins formed on the peripheral portion of the periphery portion insulating member 79 and, for example, the annular convex portions 83 formed on the periphery of the heat conductor 77 are made to fit; and accordingly, a contact area therebetween can be increased. Therefore, heat conduction efficiency from the fin-shaped insulating members 81 to the heat conductor 77 can be further enhanced and heat dissipation effect can be more enhanced than the aforementioned Embodiment 22.

Embodiment 24.

Figure 40:
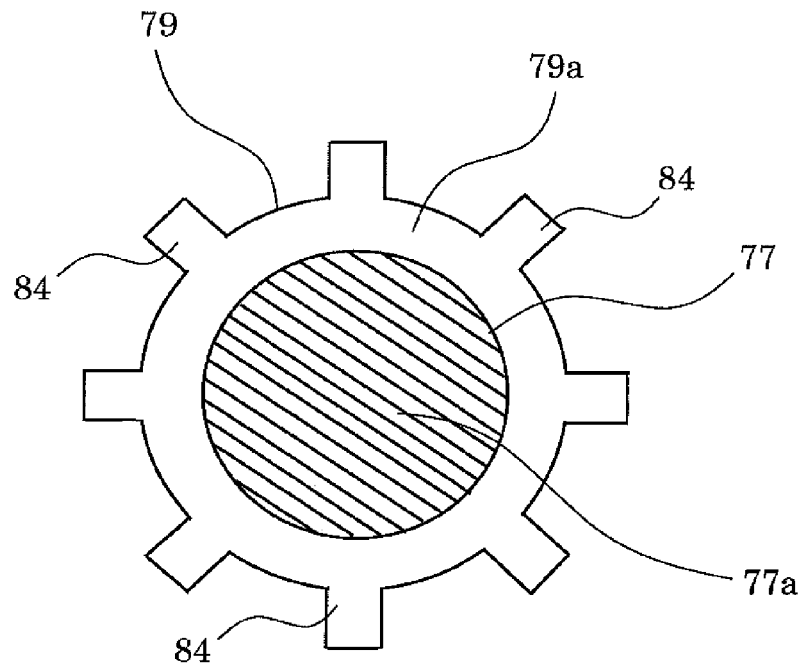
FIG. 40 is a view showing other example of a relevant part of a switchgear according to Embodiment 24 of the present invention.

Embodiment 24 of the present invention will be described with reference to FIG. 40. FIG. 40 is a cross-sectional side view showing a relevant part of a switchgear according to Embodiment 24 of the present invention.

In the aforementioned Embodiment 22, the description has been made on the case where the fin-shaped insulating members 81 configured by the annular fins formed on the peripheral portion of the periphery portion insulating member 79 are provided; however, in Embodiment 24, fin-shaped insulating members 84 configured by radiated fins extending in an axial direction are formed on a peripheral portion of a periphery portion insulating member 79.

In also Embodiment 24, the heat absorption effect of insulating gas in an apparatus vessel 40 can be obtained by the fin-shaped insulating members 84 configured by the radiated fins and similar effects to Embodiment 22 can be exhibited.

Embodiment 25.

Figure 41:
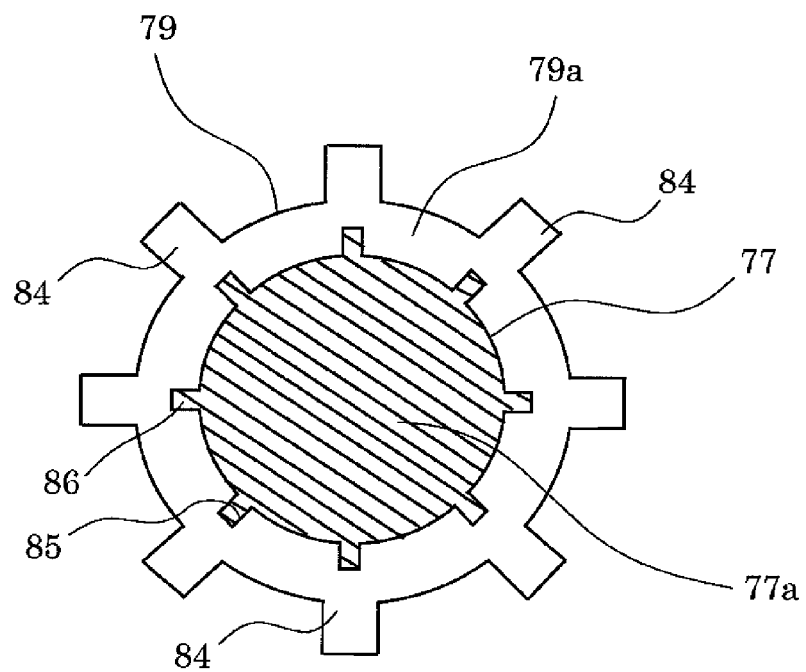
FIG. 41 is a view showing other example of a relevant part of a switchgear according to Embodiment 25 of the present invention.

Embodiment 25 of the present invention will be described with reference to FIG. 41. FIG. 41 is a cross-sectional side view showing a relevant part of a switchgear according to Embodiment 25 of the present invention.

In Embodiment 25, concave portions 85, for example, extending in an axial direction are formed on the inner side of fin-shaped insulating members 84 configured by radiated fins formed on a peripheral portion of a periphery portion insulating member 79; and, convex portions 86, for example, extending in the axial direction are formed on the periphery of the heat conductor 77, the convex portions 86 being to be fitted to the concave portions 85, for example, extending in the axial direction and formed on the inner side of the fin-shaped insulating members 84 configured by the radiated fins.

As described above, in Embodiment 25, the concave portions 85, for example, extending in the axial direction and formed on the inner side of the fin-shaped insulating member 84 configured by the radiated fins formed on the peripheral portion of the periphery portion insulating member 79 and the convex portions 86, for example, extending in the axial direction and formed on the periphery of the heat conductor 77 are made to fit; and accordingly, a contact area therebetween can be increased. Therefore, heat conduction efficiency from the fin-shaped insulating member 84 to the heat conductor 77 can be further enhanced and heat dissipation effect can be more enhanced than the aforementioned Embodiment 24.

Embodiment 26.

Figure 42:
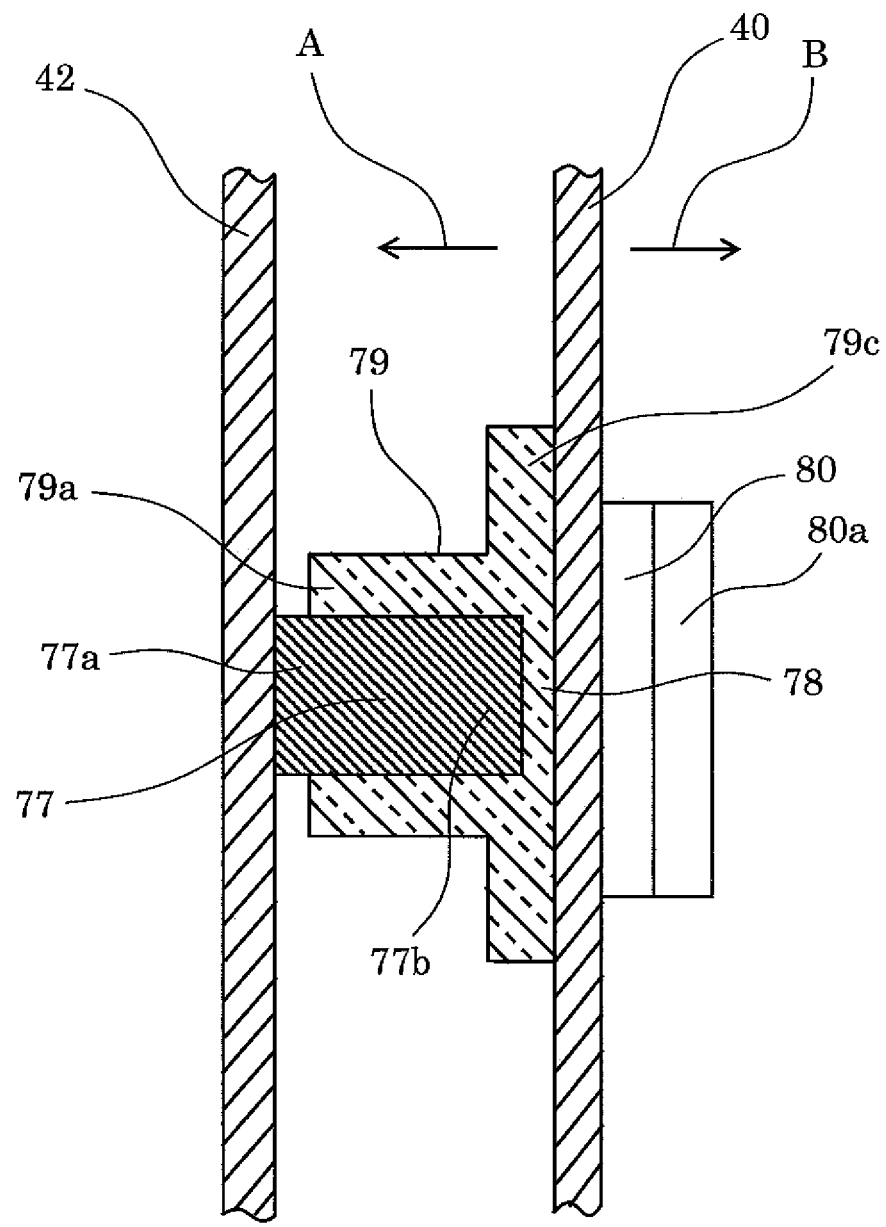
FIG. 42 is a cross-sectional side view showing a relevant part of a switchgear according to Embodiment 26 of the present invention.

Embodiment 26 of the present invention will be described with reference to FIG. 42. FIG. 42 is a cross-sectional side view showing a relevant part of a switchgear according to Embodiment 26 of the present invention.

In Embodiment 26, a periphery portion insulating member 79 is configured such that the thickness of a part 79c to be attached to the apparatus vessel 40 side is thicker than the thickness on the heat conductor 77 side. That is, as an example in the drawing, the periphery portion insulating member 77 is such that the diameter of the part 77c being positioned on the apparatus vessel 40 side is larger diameter than the diameter on the heat conductor 77 side.

As described above, in Embodiment 26, the periphery portion insulating member 79 is such that the diameter of the part 79c to be attached to the apparatus vessel 40 side is larger diameter than the diameter on the heat conductor 77 side; and accordingly, a sectional area of the periphery portion insulating member 79 can be increased and heat conduction efficiency can be further enhanced.

Furthermore, the periphery portion insulating member 79 is such that the diameter of the part 79c being positioned on the apparatus vessel 40 side is larger diameter than the diameter on the heat conductor 77 side; and accordingly, attachment of the periphery portion insulating member 779 to the apparatus vessel 40 is also easy.

Embodiment 27.

Figure 43:
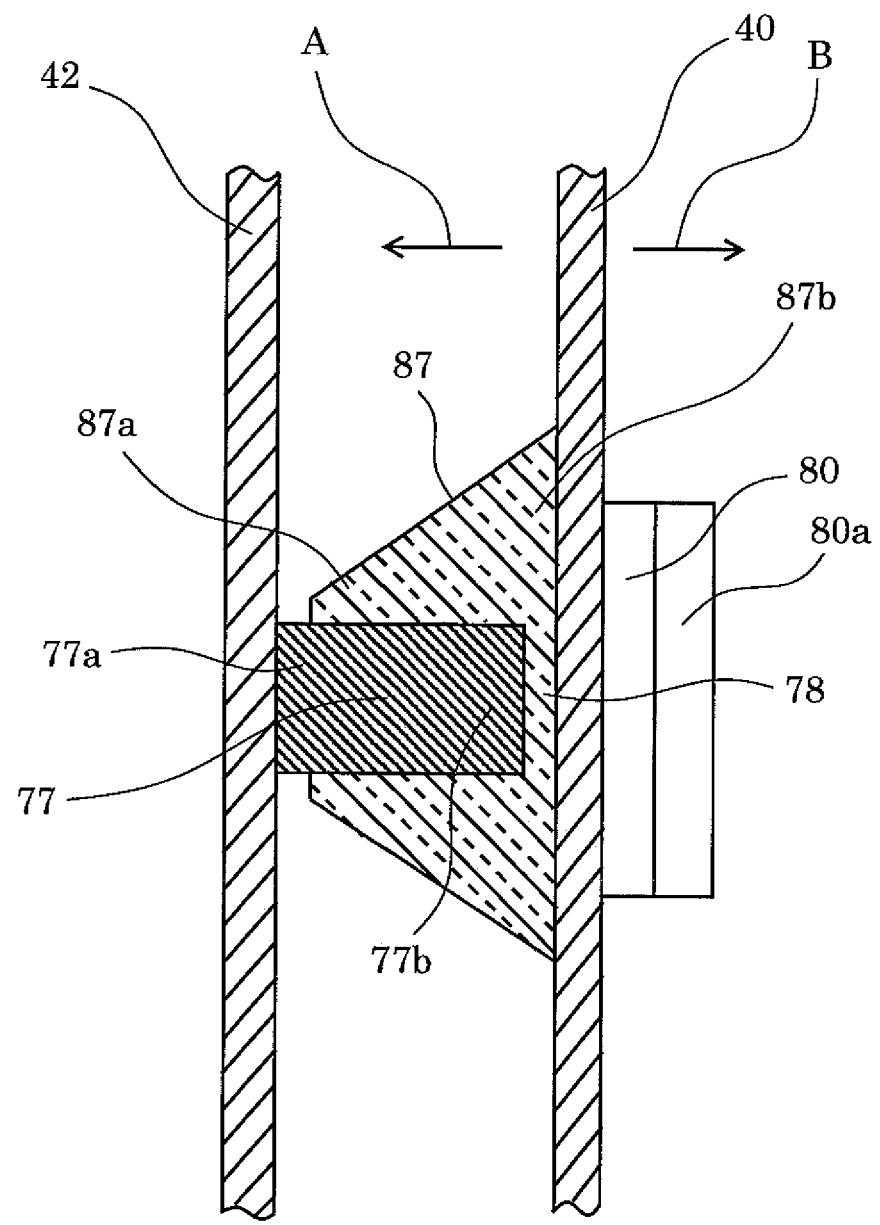
FIG. 43 is a cross-sectional side view showing a relevant part of a switchgear according to Embodiment 27 of the present invention.

Embodiment 27 of the present invention will be described with reference to FIG. 43. FIG. 43 is a cross-sectional side view showing a relevant part of a switchgear according to Embodiment 27 of the present invention.

One side 87a of a periphery portion insulating member 87 in Embodiment 27 is formed to have a small diameter, one side 87a being positioned near a main circuit conductor 42; and the other side 87b of the periphery portion insulating member 87 is formed to have a large diameter and formed in a tapered shape, the other side 87b being to be attached to the apparatus vessel 40 side.

The periphery portion insulating member 87 in Embodiment 27 is formed in the tapered shape that has a progressively larger diameter from one side 87a to the other side 87b; and accordingly, a sectional area can be more increased than the aforementioned Embodiment 26, the heat absorption effect of insulating gas in the apparatus vessel 40 is enhanced, and heat conduction efficiency can be further enhanced.

Embodiment 28.

Figure 44:
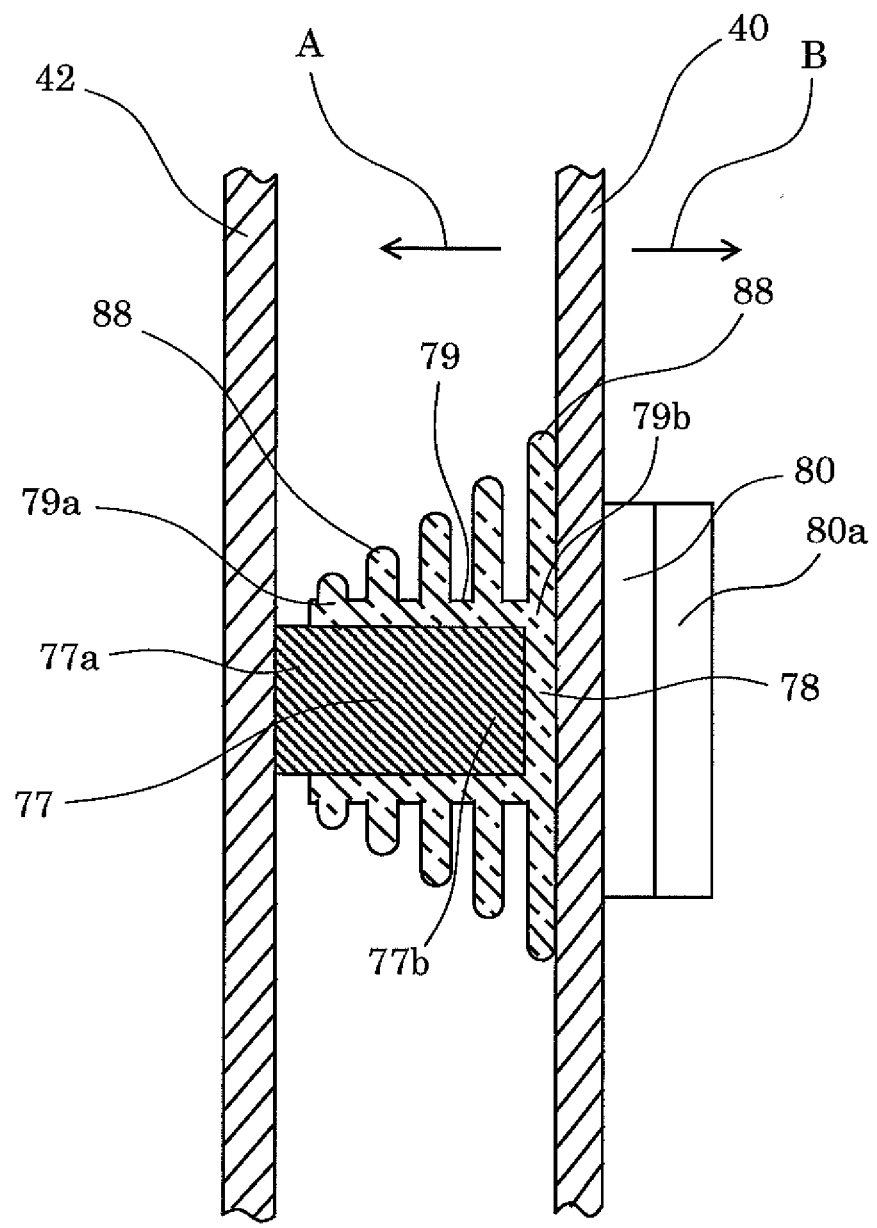
FIG. 44 is a cross-sectional side view showing a relevant part of a switchgear according to Embodiment 28 of the present invention.

Embodiment 28 of the present invention will be described with reference to FIG. 44. FIG. 44 is a cross-sectional side view showing a relevant part of a switchgear according to Embodiment 28 of the present invention.

In Embodiment 28, a fin-shaped insulating member 88 configured by, for example, an annular fin is arranged in plural numbers in an axial direction on a peripheral portion of a periphery portion insulating member 79, the fin-shaped insulating members 88 being located in an apparatus vessel 40; and the fin-shaped insulating members 88 are arranged so as to have progressively larger diameter from one side 79a to the other side 79b of the periphery portion insulating member 79.

As described above, in Embodiment 28, by the fin-shaped insulating members 88 configured by, for example, the annular fins being arranged so as to have a progressively larger diameter from one side 79a to the other side 79b of the periphery portion insulating member 79 on the peripheral portion of the periphery portion insulating member 79, a heat absorption area of insulating gas in the apparatus vessel 40 can be increased; and thus, heat of the insulating gas is further effectively absorbed and the heat can be dissipated outside the apparatus vessel 40 via a heat conductor 77, an outer wall of the apparatus vessel 40, and a heat dissipating member 80. As a result, heat dissipation performance as the whole switchgear can be further improved and similar effects to the aforementioned Embodiment 27 can be exhibited.

Embodiment 29.

Embodiment 29 of the present invention will be described with reference to FIG. 45 to FIG. 48. Each of the drawings is a cross-sectional view showing a heat conductor in a switchgear according to Embodiment 29 of the present invention.

Figure 45:
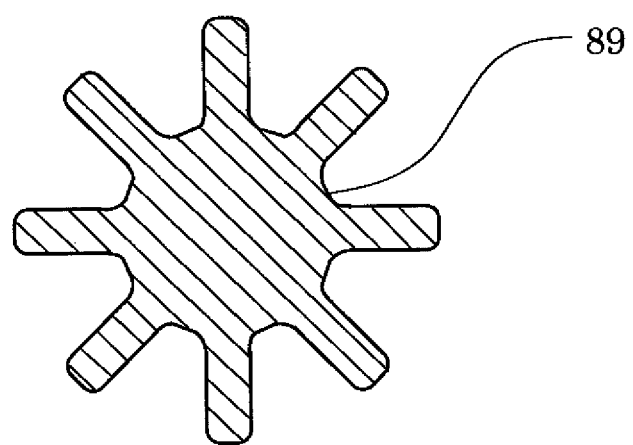
FIG. 45 is a cross-sectional view showing a heat conductor in a switchgear according to Embodiment 29 of the present invention.
Figure 46:
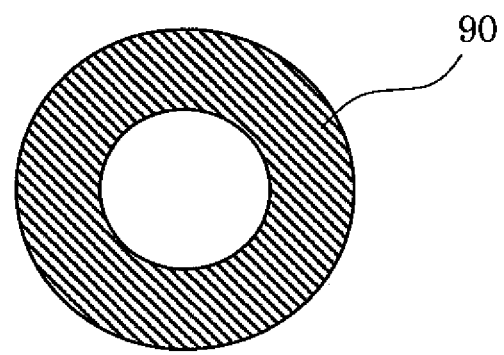
FIG. 46 is a cross-sectional view showing other example of a heat conductor in the switchgear according to Embodiment 29 of the present invention.
Figure 47:
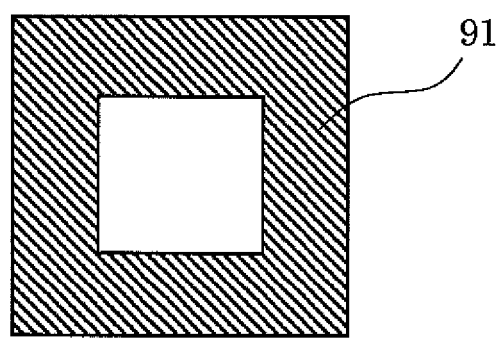
FIG. 47 is a cross-sectional view showing other example of a heat conductor in the switchgear according to Embodiment 29 of the present invention.
Figure 48:
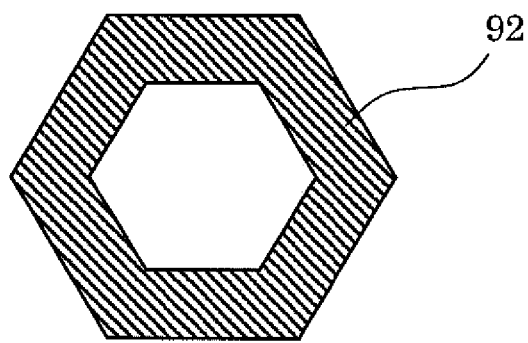
FIG. 48 is a cross-sectional view showing other example of a heat conductor in the switchgear according to Embodiment 29 of the present invention.
Figure 49:
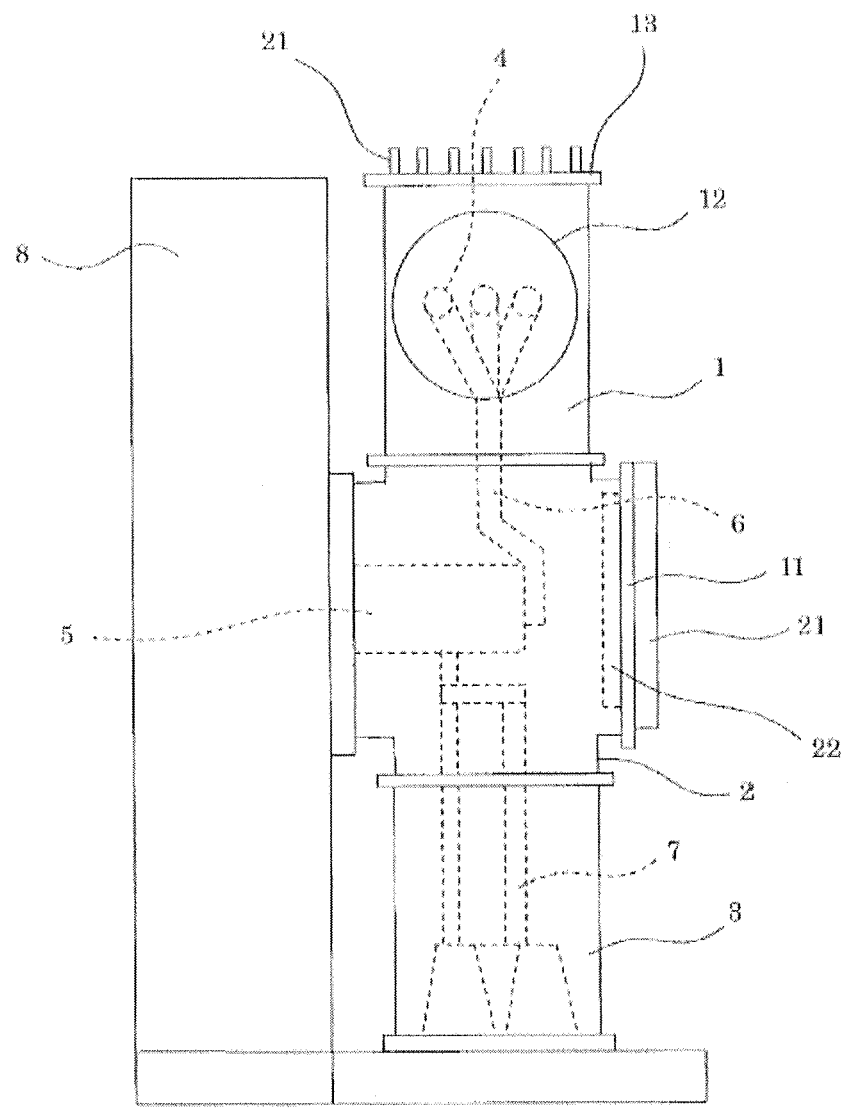
FIG. 49 is a side view showing a conventional switchgear.

By the way, in the aforementioned Embodiment 21 to 28, the heat conductor is formed in the shape of a round bar or a square bar, but not limited thereto. FIG. 45 shows a heat conductor 89 formed in a radiated shape in cross section, FIG. 46 shows a heat conductor 90 formed in a cylindrical shape, FIG. 47 shows a heat conductor 91 formed in a square tube shape, and FIG. 48 shows a heat conductor 92 formed in a hexagonal tubular shape; and similar effects to the aforementioned Embodiments 21 to 28 can be exhibited.

Industrial Applicability

The present invention relates to a switchgear equipped with a high voltage electrical apparatus such as a gas insulated switchgear placed in a vessel filled with insulating gas such as SF6 gas together with electrical apparatuses, and is suitable for achieving a switchgear with excellent heat dissipation performance and high reliability.

The invention claimed is:

1. A switchgear which dissipates heat outside an apparatus vessel, the heat being generated from an electrical apparatus placed in said apparatus vessel, said switchgear comprising:
a first heat conductor in which a first side is connected to a heat generation portion of said apparatus vessel and a second side is extended toward the apparatus vessel side;
a second heat conductor in which first side is disposed near the second side of said first heat conductor and a second side is extended outside of an interior of said apparatus vessel; and
an insulating member disposed between the second side of said first heat conductor and the first side of said second heat conductor such that electrical current does not flow from the first heat conductor to the second heat conductor.

2. The switchgear according to claim 1,
further comprising a periphery portion insulating member connected to said insulating member between the first and second heat conductors that is positioned around the second heat conductor and that extends outside of the interior of said apparatus vessel.

3. The switchgear according to claim 2,
further comprising a periphery portion insulating member connected to said insulating member between the first and second heat conductors, said periphery portion insulating member being disposed on the a periphery of said first heat conductor.

4. The switchgear according to claim 2,
further comprising a periphery portion insulating member disposed by striding over a periphery of said first heat conductor and a periphery of said second heat conductor.

5. The switchgear according to claim 2,
further comprising a heat dissipating member attached to the second side of said second heat conductor.

6. The switchgear according to claim 2,
wherein the second side of said second heat conductor is configured to be a larger shape than the first side of said second heat conductor and is attached to said apparatus vessel.

7. The switchgear according to claim 2,
wherein the second side of said second heat conductor is formed with a fin body.

8. The switchgear according to claim 3,
wherein said periphery portion insulating member on the periphery of said first heat conductor is formed with a fin-shaped insulating member.

9. The switchgear according to claim 8,
wherein said fin-shaped insulating member is configured as an annular fin.

10. The switchgear according to claim 8,
wherein said fin-shaped insulating member is configured as a radiated fin.

11. A switchgear which dissipates heat outside an apparatus vessel, the heat being generated from an electrical apparatus placed in said apparatus vessel, said switchgear comprising:
a first heat conductor in which one side is connected to a heat generation portion of said apparatus vessel and the other side is extended toward the apparatus vessel side;
a second heat conductor in which one side is disposed near the other side of said first heat conductor and the other side is extended outside said apparatus vessel;
an insulating member between conductors disposed between the other side of said first heat conductor and one side of said second heat conductor;
a periphery portion insulating member connected to said insulating member between conductors, said periphery portion insulating member being disposed on the periphery of said first heat conductor; and
wherein said first heat conductor and said second heat conductor are coaxially arranged;
wherein said periphery portion insulating member on the periphery of said first heat conductor is formed with fin-shaped insulating members; and
wherein said fin-shaped insulating member is formed with a concave portion on the inner side of the fin portion and the periphery of said first heat conductor is formed with a convex portion, the convex portion being to be fit to the concave portion of said fin-shaped insulating member.

12. The switchgear according to claim 3,
wherein said periphery portion insulating member is configured such that the thickness of a part of said periphery portion insulating member positioned around said insulating member between the heat conductors is thicker than the thickness of said insulating member between the heat conductors.

13. The switchgear according to claim 1,
wherein the second side of the second heat conductor that is extended outside of the interior of the apparatus vessel is larger than the shape of the first side of the second heat conductor.

14. The switchgear according to claim 2,
further comprising a circularly shaped flange portion connected to a portion of the periphery portion insulating member that extends outside of the interior of the apparatus vessel.

15. The switchgear according to claim 13,
further comprising a circularly shaped flange portion connected to a portion of the periphery portion insulating member that extends outside of the interior of the apparatus vessel, wherein the circularly shaped flange portion is between an exterior wall of the apparatus vessel and the second side of the second heat conductor.

16. A switchgear which dissipates heat outside an apparatus vessel, the heat being generated from an electrical apparatus placed in said apparatus vessel, said switchgear comprising:
a heat conductor in which one side is connected to a heat generation portion of said apparatus vessel and the other side is extended toward the apparatus vessel side;
an insulating member disposed between the end surface of the other side of said heat conductor and an inner wall of said apparatus vessel;
a periphery portion insulating member provided on the periphery of said heat conductor and connected to said insulating member;
a heat dissipating member attached to an outer wall of said apparatus vessel opposite to the other side of said heat conductor; and
wherein the periphery of said heat conductor is formed with fin-shaped insulating members; and
wherein said fin-shaped insulating member is formed with a concave portion on the inner side of the fin portion and the periphery of said heat conductor is formed with a convex portion, the convex portion being to be fit to the concave portion of said fin-shaped insulating member.

17. The switchgear according to claim 16,
wherein said periphery portion insulating member is configured such that the thickness on the apparatus vessel side is thicker than the thickness on the heat conductor side.

18. The switchgear according to claim 1,
wherein the heat generation portion of said apparatus vessel is a main circuit conductor.

19. The switchgear according to claim 16,
wherein the heat generation portion of said apparatus vessel is a main circuit conductor.

* * * * *